(12) United States Patent
Miyazawa et al.

(10) Patent No.: US 9,259,832 B2
(45) Date of Patent: Feb. 16, 2016

(54) HANDHELD ELECTRICAL POWER TOOLS

(75) Inventors: Masamichi Miyazawa, Anjo (JP);
Tomohiro Ukai, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 1113 days.

(21) Appl. No.: 13/206,869

(22) Filed: Aug. 10, 2011

(65) Prior Publication Data
US 2012/0048585 A1    Mar. 1, 2012

(30) Foreign Application Priority Data

Aug. 25, 2010  (JP) .................... 2010-188132
Aug. 31, 2010  (JP) .................... 2010-193869

(51) Int. Cl.
*B23B 45/00*    (2006.01)
*B25F 5/02*     (2006.01)
*B23D 51/00*    (2006.01)

(52) U.S. Cl.
CPC ............... *B25F 5/029* (2013.01); *B23D 51/00* (2013.01); *B25F 5/02* (2013.01)

(58) Field of Classification Search
CPC ............ B25F 5/00; B25F 5/02; B25C 1/043; B25C 1/143; B25C 1/008; B25C 1/046
USPC ............... 173/170; 451/344; 30/392
See application file for complete search history.

(56) References Cited

U.S. PATENT DOCUMENTS

| | | | |
|---|---|---|---|
| 3,352,368 A * | 11/1967 | Maffey, Jr. ................. | 173/169 |
| 3,785,443 A * | 1/1974 | Armbruster ................. | 173/48 |
| 5,810,525 A | 9/1998 | Ector, Sr. | |
| 6,461,088 B2 | 10/2002 | Potter et al. | |
| 6,523,267 B1 | 2/2003 | Osada et al. | |
| 7,004,367 B1 * | 2/2006 | Shen et al. ................. | 227/8 |
| 7,320,422 B2 * | 1/2008 | Schell et al. ................. | 227/120 |
| 7,407,015 B2 | 8/2008 | Stones | |
| 7,591,616 B1 | 9/2009 | Kerner | |
| 2005/0126018 A1 * | 6/2005 | Haas ................. | 30/394 |
| 2005/0183271 A1 * | 8/2005 | Sugiura et al. ................. | 30/392 |
| 2005/0194164 A1 * | 9/2005 | Saito et al. ................. | 173/48 |
| 2006/0112570 A1 | 6/2006 | Serdynski et al. | |
| 2006/0276114 A1 * | 12/2006 | Gallagher et al. ................. | 451/344 |
| 2007/0062005 A1 | 3/2007 | Beruscha et al. | |
| 2007/0120527 A1 | 5/2007 | Roehm et al. | |
| 2009/0045241 A1 * | 2/2009 | Fukinuki et al. ................. | 227/131 |

(Continued)

FOREIGN PATENT DOCUMENTS

| CN | 1579131 A | 2/2005 |
|---|---|---|
| CN | 201226692 Y | 4/2009 |

(Continued)

OTHER PUBLICATIONS

Office Action issued in Japanese Application No. 2010-188132 mailed Jan. 21, 2014 (with translation).

(Continued)

*Primary Examiner* — Robert Long
*Assistant Examiner* — Joy N Sanders
(74) *Attorney, Agent, or Firm* — Oliff PLC

(57) ABSTRACT

A handheld electrical power tool may include a plurality of grasping portions, and at least one manipulating member to actuate and deactuate a drive source of the electrical power tool. The at least one manipulating member is positioned to correspond to all of the grasping portions.

2 Claims, 14 Drawing Sheets

(56) References Cited

U.S. PATENT DOCUMENTS

| | | | |
|---|---|---|---|
| 2009/0104861 A1* | 4/2009 | Van Der Linde et al. | 451/344 |
| 2011/0100660 A1* | 5/2011 | Wu | 173/122 |
| 2011/0132959 A1* | 6/2011 | Hlinka et al. | 227/8 |
| 2011/0227429 A1 | 9/2011 | Takeda et al. | |
| 2012/0043364 A1* | 2/2012 | Coleman, Jr. | 227/8 |
| 2013/0199811 A1* | 8/2013 | Maddilate | B25F 5/02 173/170 |

FOREIGN PATENT DOCUMENTS

| | | | |
|---|---|---|---|
| CN | 201525003 U * | 7/2010 | B25C 1/06 |
| DE | 94 10 079 U1 | 9/1994 | |
| EP | 0 214 455 A1 | 3/1987 | |
| EP | 0 750 837 A1 | 1/1997 | |
| EP | 1 506 705 A1 | 2/2005 | |
| JP | 58-51982 | 4/1983 | |
| JP | A-11-239985 | 9/1999 | |
| JP | H11-239985 A | 9/1999 | |
| JP | H11-245180 A | 9/1999 | |
| JP | A-2000-301411 | 10/2000 | |
| JP | 2002/205284 A | 7/2002 | |
| JP | A-2002-370123 | 12/2002 | |
| JP | B2-3411368 | 5/2003 | |
| JP | A-2005-349565 | 12/2005 | |
| JP | 2009/083054 A | 4/2009 | |
| JP | A-2009-101432 | 5/2009 | |
| JP | A-2010-58225 | 3/2010 | |
| JP | 2010/082713 A | 4/2010 | |
| WO | WO 2009/107613 A1 | 9/2009 | |

OTHER PUBLICATIONS

Japanese Office Action issued in Japanese Patent Application No. 2010-193869 on Mar. 4, 2014 (with translation).
Dec. 8, 2011 Extended European Search Report issued in European Patent Application No. 11178573.9.
Oct. 29, 2013 Office Action issued in Chinese Patent Application No. 201110244296.8 (w/ translation).
Oct. 7, 2014 Office Action issued in Japanese Patent Application No. 2010-193869 (with translation).
Feb. 4, 2015 Office Action issued in European Application No. 11178573.9.
May 12, 2015 Office Action issued in Japanese Application No. 2010-193869.
Sep. 25, 2015 Office Action issued in U.S. Appl. No. 13/852,580.

* cited by examiner

HANDHELD ELECTRICAL POWER TOOLS

BACKGROUND OF THE INVENTION

1. Field of the Invention

The present invention relates to handheld electrical power tools such as electrical reciprocating saws.

2. Description of Related Art

Generally, a relatively small handheld electrical power tool, e.g., an electrical reciprocating saw, has a tool main body, an electric motor as a drive source, and a blade member or saw blade attached to a front end portion of the tool main body, and is constructed such that the tool main body can be used as a grip. The electric motor is received in the tool main body. The tool main body has a manipulating member (switch) that is capable of actuating or deactuating the electric motor. The manipulating member is formed in a side wall, so that a user can touch or manipulate the manipulating member in his/her hand that is holding the tool main body (the grip).

Such an electrical reciprocating saw is taught, for example, by Japanese Laid-Open Patent Publication Number 2009-101432. In the electrical reciprocating saw, the manipulating member is positioned on a substantially central portion of the tool main body in a longitudinal direction thereof such that the user can relatively easily manipulate the manipulating member regardless of whether the user grips the tool main body with one hand or both hands. However, there is a need in the art for an improved electrical reciprocating saw (an improved handheld electrical power tool).

Further, in order to attach the saw blade to the front end portion of the tool main body or to detach the same therefrom, a small special-purpose tool (e.g., a hexagonal wrench) must be used. Therefore, it would be convenient to the user if the special-purpose tool is available immediately when needed.

BRIEF SUMMARY OF THE INVENTION

In one aspect of the present invention, a handheld electrical power tool may include a plurality of grasping portions, and at least one manipulating member to actuate and deactuate a drive source of the electrical power tool. The at least one manipulating member is positioned to correspond to all of the grasping portions.

According to this aspect, a user can easily touch or manipulate the manipulating members regardless of whether the user grips the tool main body (the grasping portions) with one hand or both hands. In particular, the user can easily touch or manipulate the at least one manipulating member even when the user grips a forwardmost portion of the tool main body with one hand. Thus, the handheld electrical power tool may have increased operability.

Optionally, the grasping portions may include first to third grasping portions. The at least one manipulating member may include first and second manipulating members. The first manipulating member is positioned to correspond to the first and second grasping portions. The second manipulating member is positioned to correspond to the third grasping portion. Further, the first and second manipulating members are respectively arranged and constructed to turn on and off a single electrical switch to actuate and deactuate the drive source. Therefore, it is possible to increase the operability of the handheld electrical power tool without increasing manufacturing costs thereof.

Further, the single electrical switch may be a variable switch that is capable of changing an output voltage thereof depending upon a moving distance of an actuator button thereof, so that an output of the drive source can be continuously changed depending upon a manipulation distance of each of the first and second manipulating members. Thus, the handheld electrical power tool may have further increased operability.

Other objects, features and advantages of the present invention will be readily understood after reading the following detailed description together with the accompanying drawings and the claims.

BRIEF DESCRIPTION OF THE DRAWINGS

FIG. 1 is a side view in section of a tool main body of an electrical reciprocating saw according to a first representative embodiment of the present invention, in which both of a first (front) manipulating member and a second (rear) manipulating member are not actuated or turned on;

FIG. 2 is a partially enlarged side view in section of the tool main body of the electrical reciprocating saw, in which the first manipulating member is turned on whereas the second manipulating member is not turned on;

FIG. 3 is a partially enlarged side view in section of the tool main body of the electrical reciprocating saw, in which the first manipulating member is not turned on whereas the second manipulating member is turned on;

FIG. 4 is a partially enlarged side view of a tool main body of an electrical reciprocating saw according to a second representative embodiment of the present invention, in which construction elements are imaginarily shown and in which a third manipulating member is turned on;

DETAILED DESCRIPTION OF THE INVENTION

Figure 1:
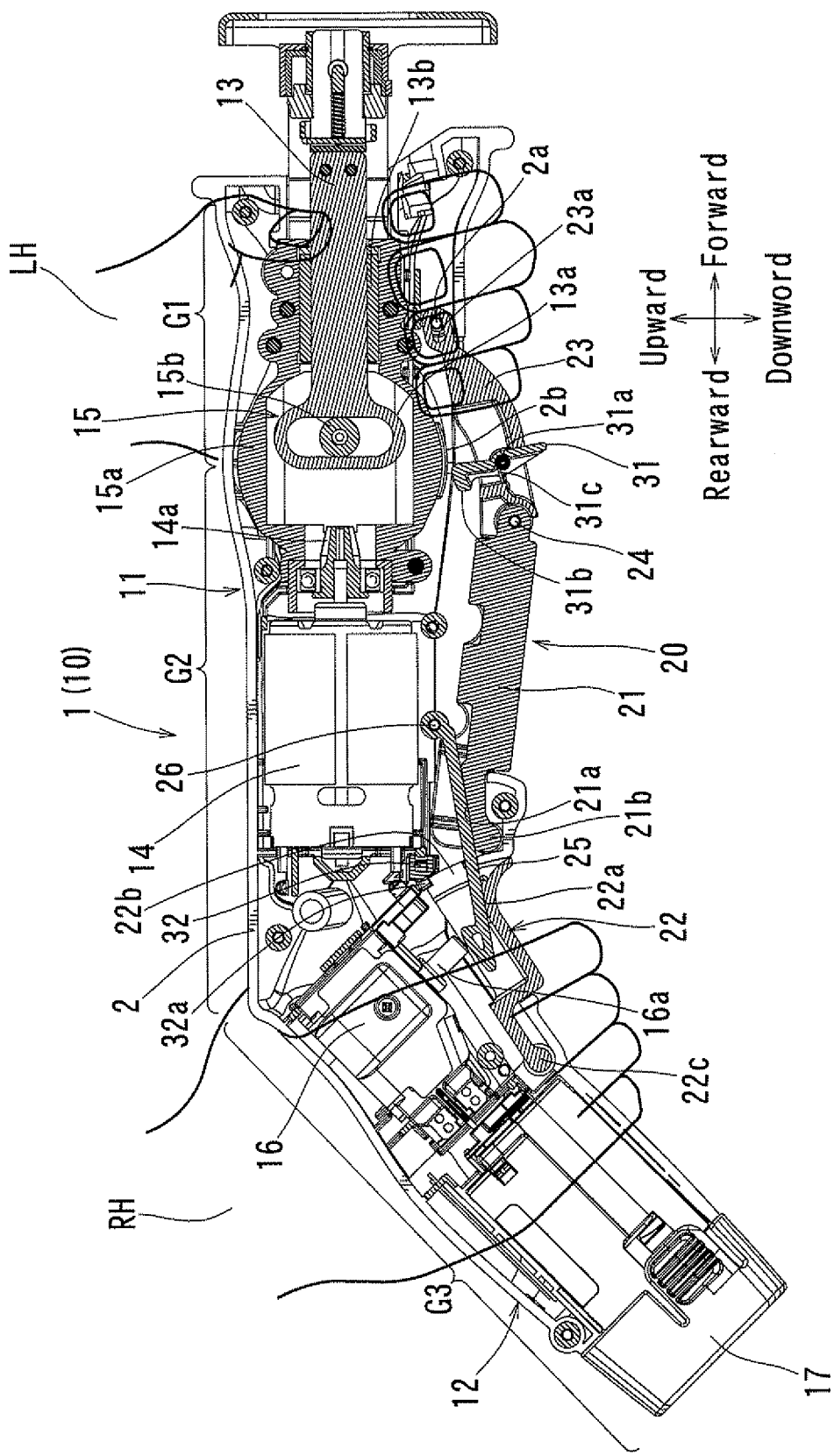

Next, the representative embodiments of the present invention will be described with reference to the drawings.

First Embodiment

A first embodiment of the present invention will be described with reference to FIGS. 1 to 3.

In this embodiment, a relatively small electrical reciprocating saw 1 is exemplified as a handheld electrical power tool. The electrical reciprocating saw 1 includes a tool main body 10 (a main body housing 2) that is angled downwardly rearwardly at a substantially central portion thereof. Therefore, a front half and an angled rear half of the tool main body 10 will respectively be hereinafter referred to as a front main body portion 11 and a rear main body portion 12. The tool main body 10 has an output rod 13 that is projected forwardly from a front end portion of the front main body portion 11 thereof. As will be recognized, the output rod 13 is constructed such that a blade member or saw blade (not shown) can be attached thereto.

The electrical reciprocating saw 1 has an electric motor 14 as a drive source that is received in the front main body portion 11 of the tool main body 10. The electric motor 14 is connected to the output rod 13 via a reciprocating motion conversion mechanism 15, so that rotational motion of the electric motor 14 can be converted to reciprocating motion of the output rod 13. The reciprocating motion conversion mechanism 15 has a gear seat 15a, a bevel gear (not shown) rotatably supported on the gear seat 15a, and an eccentric roller 15b attached to the bevel gear. The electric motor 14 has an output gear 14a. The output gear 14a is meshed with the bevel gear. Conversely, the eccentric roller 15b engages a slider portion 13a that is formed in a rear portion of the output rod 13. The output rod 13 is slidably supported by a bearing 13b, so as to be reciprocated in a longitudinal direction (in a back and forth direction). Therefore, when the electric motor 14 is actuated, the bevel gear is rotated, so as to revolve the eccentric roller 15b. Upon revolution of the eccentric roller 15b, the output rod 13 can be longitudinally reciprocated by longitudinal components of a force produced by revolution of the eccentric roller 15b. Because the reciprocating motion conversion mechanism 15 has a known structure, a detailed description thereof may be omitted.

The electric motor 14 is capable of being actuated and deactuated by on-off motion of an electrical switch 16 that is disposed in a front portion of the rear main body portion 12 of the tool main body 10. Further, the electric motor 14 is powered by a rechargeable battery 17 that is inserted into a rear portion of the rear main body portion 12.

As described above, the tool main body 10 of the electrical reciprocating saw 1 includes the output rod 13, the reciprocating motion conversion mechanism 15, the electric motor 14, the electrical switch 16 and the battery 17 that are arranged in series therealong from before backwardly. The tool main body 10 thus constructed has a relatively elongated shape. Therefore, a user can use the electrical reciprocating saw 1 to cut a work-piece (not shown) such as a woody material while grasping the tool main body 10 with one hand or both hands.

The tool main body 10 has a first or front grasping portion G1 and a second or central grasping portion G2 that are respectively formed in the front main body portion 11 of the tool main body 10. Further, the tool main body 10 has a third or rear grasping portion G3 that is formed in the rear main body portion 12 of the tool main body 10. In particular, the first grasping portion G1 is formed in a front half of the front main body portion 11, i.e., a front portion of the front main body portion 11 including a central portion of the reciprocating motion conversion mechanism 15 (a central portion of the gear seat 15a). The second grasping portion G2 is formed in a rear half of the front main body portion 11, i.e., a remaining portion of the front main body portion 11. The third grasping portion G3 is formed in a front half of the rear main body portion 12.

As shown in FIG. 1, when the user grasps the tool main body 10 with both hands, i.e., a right hand RH and a left hand LH, the user can respectively grasp the first grasping portion G1 and the third grasping portion G3 with the left hand LH and the right hand RH. Conversely, when the user grasps the tool main body 10 with one hand, i.e., the right hand RH or the left hand LH, the user can grasp the first grasping portion G1, the second grasping portion G2 or the third grasping portion G3 with the left hand LH or the right hand RH.

The electrical reciprocating saw 1 has two (first and second) manipulating members 20 and 22 that are respectively capable of actuating or deactuating the electric motor 14, i.e., turning on and off the electrical switch 16. The first manipulating member 20 is attached to the front main body portion 11 of the tool main body 10 so as to correspond to the first grasping portion G1 and the second grasping portion G2. Conversely, the second manipulating member 22 is attached to the rear main body portion 12 of the tool main body 10 so as to correspond to the third grasping portion G3. Thus, the first and second manipulating members 20 and 22 are positioned so as to cover all of the first to third grasping portions G1 to G3. Therefore, the user can easily touch or manipulate at least one of the first and second manipulating members 20 and 22 regardless of whether the user grips the tool main body 10 with one hand or both hands. Further, the electrical reciprocating saw 1 has an actuator lever 25 that is vertically rotatably (tiltably) connected to the main body housing 2 via a pivot shaft 26. The actuator lever 25 has a contact portion 25a that is formed in a distal end thereof. The contact portion 25a is arranged and constructed to contact an actuator button 16a of the electrical switch 16.

Figure 2:
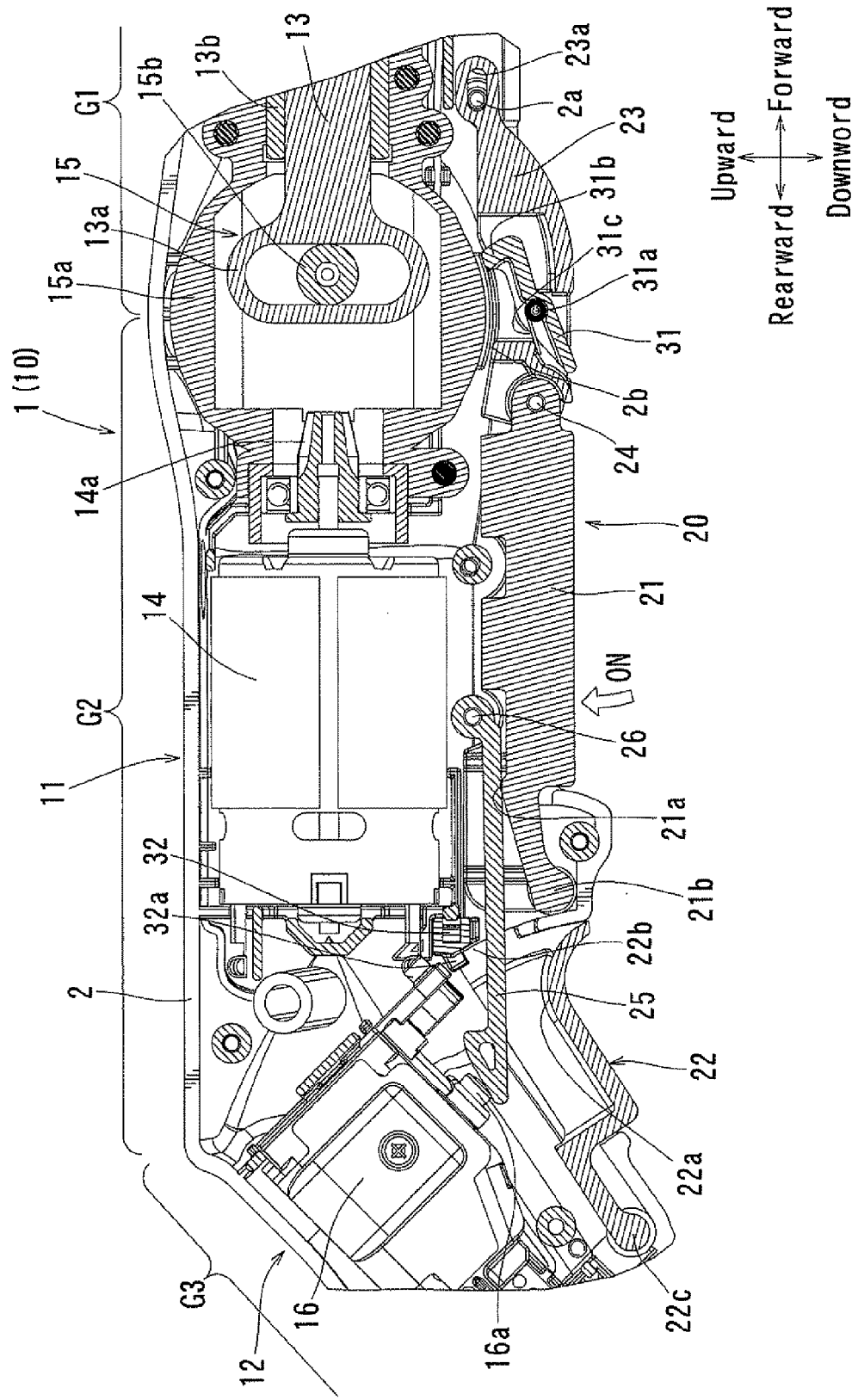
Figure 3:
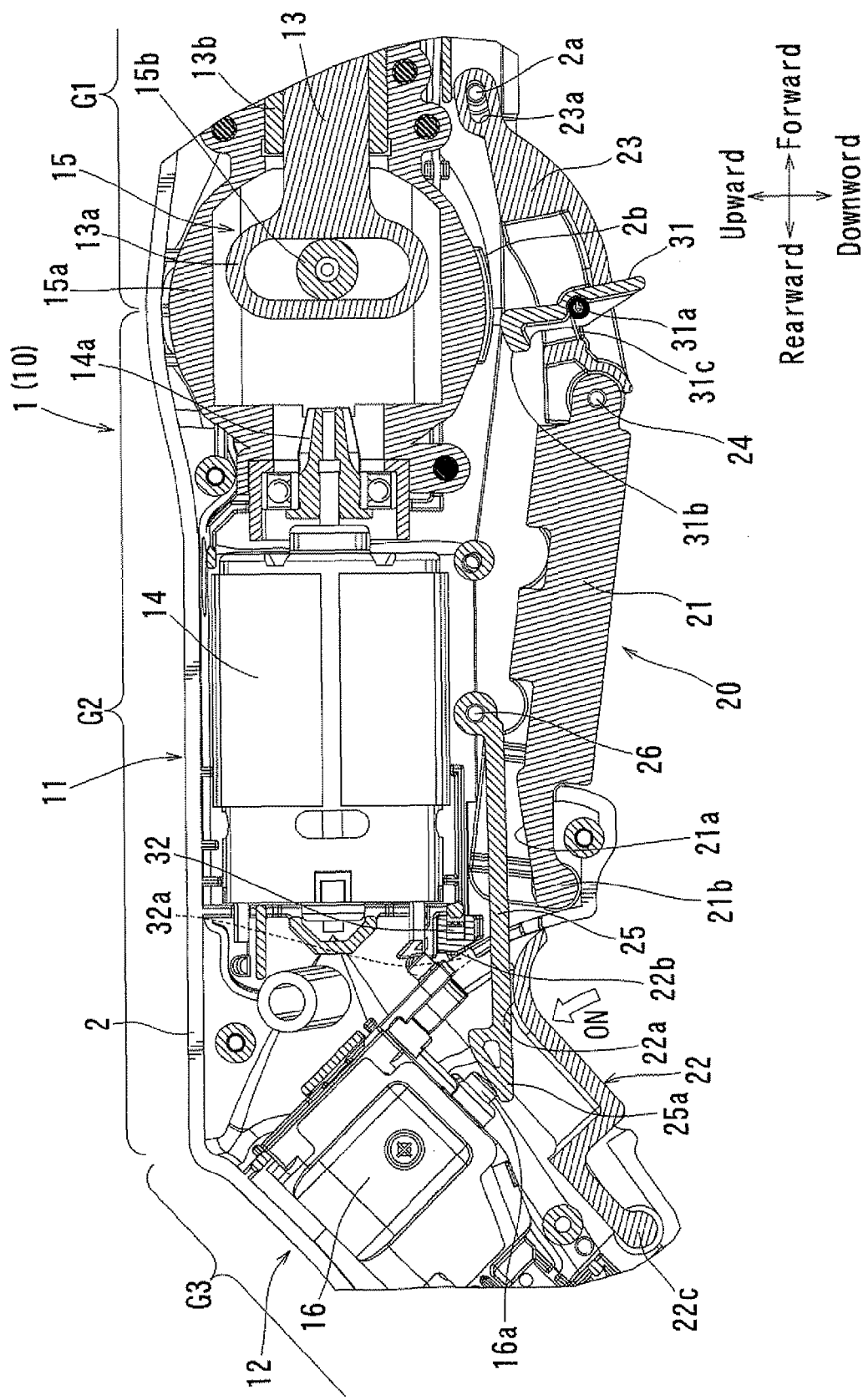

As shown in FIGS. 1 to 3, the first and second manipulating members 20 and 22 are respectively positioned along a lower surface of the tool main body 10, i.e., along a lower surface of the front main body portion 11 and a lower surface of the rear main body portion 12. The first manipulating member 20 is formed as an elongated switch lever such that the user can put his/her four fingers thereon. Preferably, the first manipulating member 20 has a length greater than third part of an entire length of the tool main body 10.

The first manipulating member 20 is composed of a rear (first) large lever portion 21 and a front (second) small lever portion 23. A front end portion of the large lever portion 21 is rotatably or pivotally connected to a rear end portion of the small lever portion 23 via a connecting shaft 24. That is, the large lever portion 21 and the small lever portion 23 are articulated to each other via the connecting shaft 24 so as to be flexed thereabout. The large lever portion 21 has a first acting portion 21a and a support portion 21b that are formed in a rear end portion thereof. The support portion 21b is rotatably supported on the main body housing 2 such that the large lever portion 21 can be vertically tilted thereabout. The first acting portion 21a is positioned below the actuator lever 25, so as to push up or upwardly rotate the actuator lever 25 when the large lever portion 21 is tilted upwardly.

The small lever portion 23 has a laterally elongated support hole 23a that is formed in a front portion thereof. Conversely, the main body housing 2 has a support shaft 2a that is formed therein. The support shaft 2a is movably received in the support hole 23a of the small lever portion 23. Thus, the small lever portion 23 can be vertically tilted about the support shaft 2a while sliding longitudinally over a predetermined range.

Thus, the divided first manipulating member 20 can be changed between an off-position in which the first manipulating member 20 is bulged downwardly (FIGS. 1 and 3) and an on-position in which the first manipulating member 20 is not bulged downwardly and is substantially flattened (FIG. 2).

The second manipulating member 22 is formed as a relatively shortened trigger-type switch lever. The second manipulating member 22 may preferably be shaped such that the user can manipulate the same by the index finger of his/her hand that is grasping the third grasping portion G3. The second manipulating member 22 has a second acting portion 22a and a support portion 22c that are respectively formed in a front and rear end portions thereof. The support portion 22c is rotatably supported on a lower portion of the main body housing 2 such that the second manipulating member 22 can be vertically tilted thereabout. The second acting portion 22a is positioned below the actuator lever 25, so as to push up or upwardly rotate the actuator lever 25 when the second manipulating member 22 is tilted upwardly. As will be apparent from the drawings, the second manipulating member 22 may preferably be positioned behind the first manipulating member 20 so as to be longitudinally aligned therewith.

The electrical switch 16 is constructed to be turned on to actuate the electric motor 14 when the actuator button 16a is pressed. The actuator button 16a of the electrical switch 16 is biased in a turn-off direction by a spring (not shown) so as to be normally projected and turned off. When the actuator button 16a is pushed against a spring force of the spring, the electrical switch 16 can be turned on. Further, in this embodiment, a variable switch that is capable of changing an output voltage thereof is used as the electrical switch 16. That is, the electrical switch 16 is constructed such that an output voltage thereof can be changed depending upon a push-in distance or moving distance of the actuator button 16a when the electrical switch 16 is turned on.

As previously described, the contact portion 25a of the actuator lever 25 contacts the actuator button 16a of the electrical switch 16. Therefore, as shown in FIG. 1, the actuator lever 25 can be indirectly biased by the spring force of the spring in a direction in which it can be tilted in a turn-off direction thereof (downwardly or counterclockwise in FIG. 1). When the actuator lever 25 is biased in the turn-off direction thereof, the large lever portion 21 of the first manipulating member 20 and the second manipulating member 22 can be biased in a direction in which they can be tilted in a turn-off direction thereof (downwardly). Further, when the large lever portion 21 is biased, the small lever portion 23 can also be indirectly biased in a direction in which it can be tilted in a turn-off direction thereof (downwardly) by the actuator lever 25.

When the small lever portion 23 of the first manipulating member 20 is manipulated by a finger (e.g., the little finger) of the left hand LH (or the right hand RH) that is grasping the first grasping portion G1 formed in the front main body portion 11 and is pressed upwardly against an indirect biasing force caused by the spring force applied to the actuator button 16a, the actuator lever 25 can be pressed upwardly, i.e., in a turn-on direction thereof, so that the actuator button 16a can be pushed in. As a result, the electrical switch 16 can be turned on, so that the electric motor 14 can be actuated. Further, when the second manipulating member 22 is manipulated by a finger (e.g., the index finger) of the right hand RH (or the left hand LH) that is grasping the third grasping portion G3 formed in the rear main body portion 12 and is pressed upwardly against the indirect biasing force caused by the spring force applied to the actuator button 16a, the actuator lever 25 can be pressed upwardly, i.e., in the turn-on direction thereof, so that the actuator button 16a can be pushed in. As a result, the electrical switch 16 can be turned on, so that the electric motor 14 can be actuated. Thus, when one of the small lever portion 23 of the first manipulating member 20 and the second manipulating member 22 is manipulated in a turn-on direction thereof, the electrical switch 16 common to the first and second manipulating members 20 and 22 can be turned on, so that the electric motor 14 can be actuated.

As will be appreciated, the push-in distance or moving distance of the actuator button 16a can be gradually increased as a manipulation distance or traveling distance of the first manipulating member 20 (the small lever portion 23) or the second manipulating member 22 is increased. As described above, because the electrical switch 16 is the variable switch, the output voltage of the electrical switch 16 can be gradually increased as the manipulation distance of the first manipulating member 20 (the small lever portion 23) or the second manipulating member 22 is increased, so that a number of rotations of the electric motor 14 can be increased. Thus, the electrical reciprocating saw 1 may have increased cutting performance as the manipulation distance of the first manipulating member 20 (the small lever portion 23) or the second manipulating member 22 is increased.

The first and second manipulating members 20 and 22 respectively have first and second locking mechanisms. That is, a first locking lever 31 as the first locking mechanism is attached to the small lever portion 23 of the first manipulating member 20. Conversely, a second locking lever 32 as the second locking mechanism is positioned above the second manipulating member 22.

The first locking lever 31 is vertically rotatably (tiltably) connected to the small lever portion 23 via a pivot shaft 31a, so as to be tilted between a locking position and an unlocking position. As will be appreciated, the locking position of the first locking lever 31 corresponds to a raised or vertical position in which a lower portion thereof is projected downwardly from the small lever portion 23 and in which an upper portion (an interfering portion 31b) thereof is projected upwardly from the small lever portion 23 into the main body housing 2 (FIGS. 1 and 3). Conversely, the unlocking position of the first locking lever 31 corresponds to a laid or horizontal position in which the lower portion thereof is not projected downwardly from the small lever portion 23 and in which the upper interfering portion 31b thereof is not projected upwardly from the small lever portion 23 into the main body housing 2 (FIG. 2). Further, the first locking lever 31 is normally biased toward the locking position thereof via a torsion spring 31c.

As shown in FIGS. 1 and 3, when the first locking lever 31 is in the locking position, the interfering portion 31b is projected into the main body housing 2 so as to interfere with a portion of the main body housing 2 (in particular, a rib 2b that is formed in the main body housing 2 in order to support the gear seat 15a). As a result, both of the large lever portion 21 and the small lever portion 23 of the first manipulating member 20 can be prevented or restricted from being pressed upwardly (i.e., manipulated in the turn-on direction thereof), so that the first manipulating member 20 can be maintained in a locked condition (an inoperable condition) in which the first manipulating member 20 is locked in a turn-off position. To the contrary, when the first locking lever 31 is tilted or rotated clockwise against a spring force of the torsion spring 31c, the first locking lever 31 can be changed to the unlocking position in which the interfering portion 31b is not projected into the main body housing 2 (FIG. 2), which correspond to a locked condition canceling mechanism. As a result, both of the large lever portion 21 and the small lever portion 23 of the first manipulating member 20 are allowed to be pressed upwardly, so that the first manipulating member 20 can be changed to an unlocked condition (an operable condition) in which a turn-on operation of the first manipulating member 20 is allowed (i.e., in which the first manipulating member 20 can be moved from the turn-off position toward a turn-on position).

As shown in FIG. 2, when the large lever portion 21 or the small lever portion 23 of the first manipulating member 20 is pressed upwardly toward in the unlocked condition of the first manipulating member 20, the actuator lever 25 can be tilted upwardly about the pivot shaft 26. As a result, the electrical switch 16 can be turned on, so that the electric motor 14 can be actuated. As shown in FIG. 1, when both of the large lever portion 21 and the small lever portion 23 of the first manipulating member 20 are released, each of the large lever portion 21 and the small lever portion 23 can be moved in the turn-off direction by the indirect biasing force caused by the spring force applied to the actuator button 16a, so that the first manipulating member 20 can be returned to the turn-off position. Simultaneously, the first locking lever 31 can be automatically returned to the locking position by the spring force of the torsion spring 31c.

The second locking lever 32 is positioned above the second manipulating member 22 and is positioned in a rear portion of the second grasping portion G2. The second locking lever 32 is formed as an elongated rod and is laterally positioned in the main body housing 2. The second locking lever 32 is arranged and constructed to be moved in a lateral direction (in a front-back direction in the drawings), so as to be positioned in a locking position and an unlocking position. The second locking lever 32 has an interfering portion 32a that is positioned roughly in a central portion in a longitudinal direction thereof. Conversely, an engagement portion 22b corresponding to the interfering portion 32a of the second locking lever 32 is formed in a front portion of the second manipulating member 22. As shown in FIGS. 1 and 2, when the second locking lever 32 is in the locking position, the interfering portion 32a can be positioned above the engagement portion 22b of the second manipulating member 22. As a result, the second manipulating member 22 can be prevented or restricted from being pressed upwardly (i.e., from being manipulated in the turn-on direction thereof), so as to be maintained in a locked condition (an inoperable condition) in which a turn-on operation (an upwardly pressing operation) of the second manipulating member 22 is restricted.

When the second locking lever 32 is moved laterally (rightward or leftward) to be shifted to the unlocking position, the interfering portion 32a positioned above the engagement portion 22b can be retracted or displaced laterally. As a result, the second manipulating member 22 is allowed to be pressed upwardly, so as to be changed to an unlocked condition (an operable condition). Further, the second locking lever 32 is arranged and constructed to be maintained in the locking position and the unlocking position by a retainer mechanism, e.g., a click mechanism. As will be recognized, when the second locking lever 32 is maintained in the unlocking position, the second manipulating member 22 can be maintained in the unlocked condition in which the turn-on operation of the second manipulating member 22 is not restricted, which correspond to a locked condition canceling mechanism.

As described above, in the electrical reciprocating saw 1, the small lever portion 23 of the first manipulating member 20 is disposed on the first grasping portion G1, i.e., a forwardmost portion of the tool main body 10. The large lever portion 21 of the first manipulating member 20 is disposed on the second grasping portion G2 positioned behind the first grasping portion G1. Further, the second manipulating member 22 is disposed on the third grasping portion G3, i.e., a rearwardmost portion of the tool main body 10. Therefore, when the user operates the electrical reciprocating saw 1 while grasping the first grasping portion G1 with one hand, e.g., the left hand LH, the user can manipulate or press the small lever portion 23 of the first manipulating member 20 by a finger (e.g., the little finger) of the hand that is grasping the first grasping portion G1 in order to turn on the electrical switch 16 (to actuate the electric motor 14). As a result, it is not necessary for the user to use the other hand, e.g., the right hand RH, in order to turn on the electrical switch 16.

Further, when the user operates the electrical reciprocating saw 1 while grasping the second grasping portion G2 with one hand, e.g., the left hand LH, the user can manipulate or press the large lever portion 21 of the first manipulating member 20 with the hand that is grasping the second grasping portion G2 in order to turn on the electrical switch 16. Similarly, when the user operates the electrical reciprocating saw 1 while grasping the third grasping portion G3 with one hand, e.g., the left hand LH, the user can manipulate or press the second manipulating member 22 with the hand that is grasping the third grasping portion G3 in order to turn on the electrical switch 16. Thus, regardless of whether the user grasps the first grasping portion G1, the second grasping portion G2 or the third grasping portion G3 with one hand, the user can manipulate the first manipulating member 20 or the second manipulating member 22 with the hand that is grasping the first grasping portion G1, the second grasping portion G2 or the third grasping portion G3 in order to turn on the electrical switch 16.

Further, when the user operates the electrical reciprocating saw 1 while grasping the tool main body 10 with both hands, e.g., while grasping the first grasping portion G1 or the second grasping portion G2 with one hand (e.g., the left hand LH) and grasping the third grasping portion G3 with the other hand (e.g., the right hand RH), the user can manipulate the large lever portion 21 or the small lever portion 23 of the first manipulating member 20 or the second manipulating member 22 with the corresponding hand in order to turn on the electrical switch 16.

Further, the first manipulating member 20 and the second manipulating member 22 are arranged and constructed to turn on and off the electrical switch 16 (i.e., a single or common switch) via the actuator lever 25 when they are manipulated or pulled. Therefore, it is possible to provide the electrical reciprocating saw 1 in which the electric motor 14 can be easily actuated at a plurality of manipulating portions (i.e., the large lever portion 21 and the small lever portion 23 of the first manipulating member 20 and the second manipulating member 22) without increasing manufacturing costs.

As described above, the electrical switch 16 is the variable switch. Therefore, the output voltage of the electrical switch 16 (i.e., the number of rotations of the electric motor 14) can be continuously changed by changing the manipulation distance of the first manipulating member 20 or the second manipulating member 22. As a result, it is possible to continuously change a reciprocating speed of the output rod 13 (an output of the electric motor 14). Thus, the electrical reciprocating saw 1 may have increased operability.

Further, the first and second manipulating members 20 and 22 respectively have the locking mechanisms. Therefore, the first and second manipulating members 20 and 22 can be effectively prevented from being erroneously or incorrectly operated. Further, each of the first and second manipulating members 20 and 22 has the locked condition canceling mechanism (function) that is capable of canceling the locked condition thereof without any complicated operation. Therefore, each of the second manipulating members 20 and 22 can be quickly changed from the locked condition to the unlocked condition. Thus, the electrical reciprocating saw 1 may have increased operability.

Various changes and modifications may be made to the present invention without departing from the scope of the previously shown and described embodiment. For example, in the embodiment, the tool main body 10 has the first to third grasping portions G1, G2 and G3. Further, the small lever portion 23 and the large lever portion 21 of the first manipulating member 20 and the second manipulating member 22 are disposed so as to respectively correspond to the first to third grasping portions G1, G2 and G3. However, the second grasping portions G2 and the corresponding large lever portion 21 can be omitted. To the contrary, the tool main body 10 can have four or more grasping portions and four or more corresponding manipulating members as necessary.

Further, the locking mechanisms and the locked condition canceling mechanism can be omitted, if necessary.

Further, the first manipulating member 20 and the second manipulating member 22 are arranged and constructed to turn on the single switch (the electrical switch 16). However, the first manipulating member 20 and the second manipulating member 22 can be arranged and constructed to separately turn on and off two electrical switches.

Second Embodiment

The second detailed representative embodiment will now described with reference to FIG. 4.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 4:
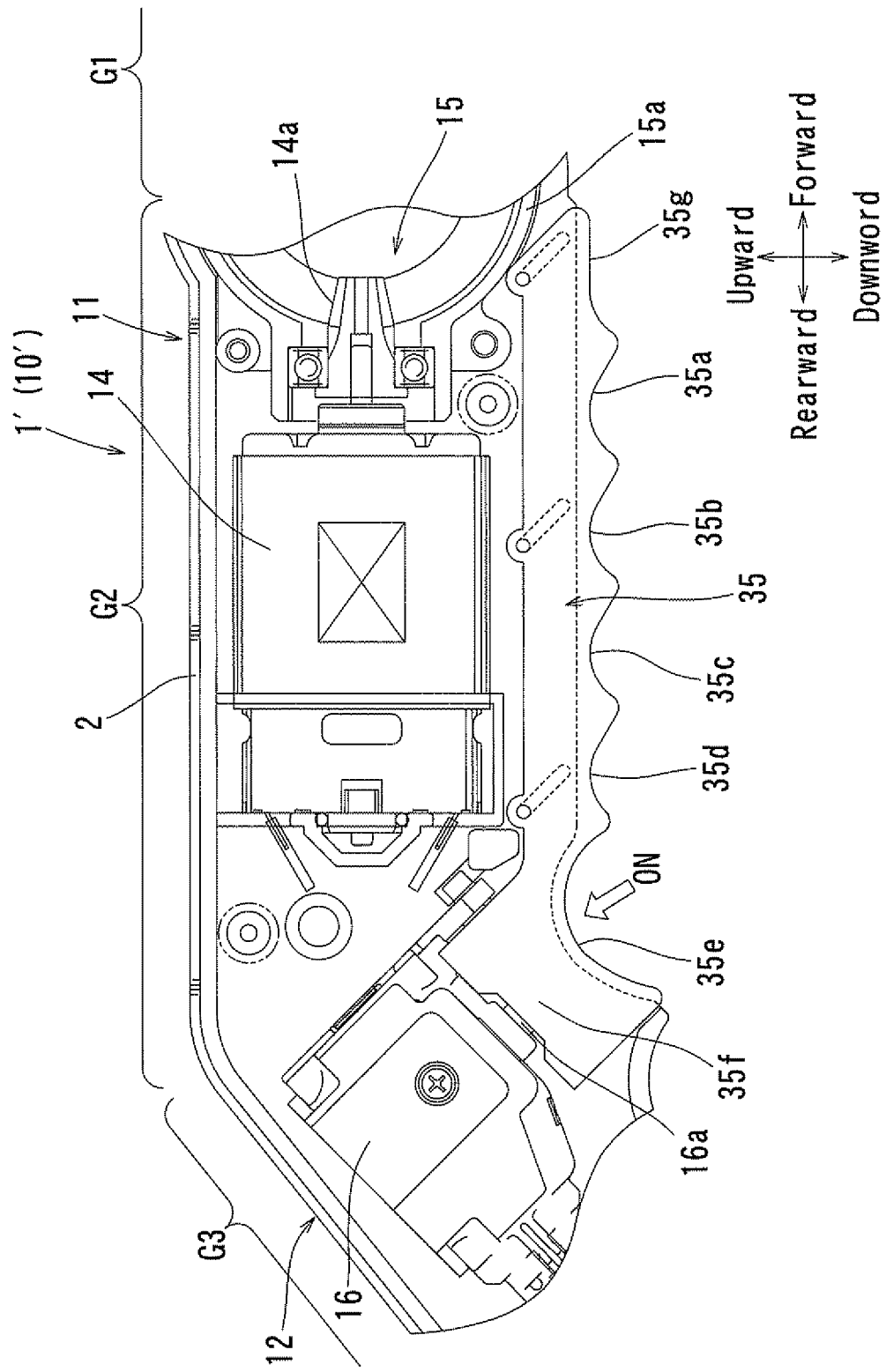

As shown in FIG. 4, in this embodiment, the first manipulating member 20 and the second manipulating member 22 are replaced with a single third manipulating member 35. The third manipulating member 35 extends from a rear portion of the first grasping portion G1 to a front portion of the third grasping portion G3 and has a length greater than third part of the entire length of a tool main body 10' of an electrical reciprocating saw 1'. The third manipulating member 35 is movably attached to a lower surface of the main body housing 2. As shown by an outline arrow in FIG. 4, the third manipulating member 35 is capable of moving in a moving direction (a push-in direction) of the actuator button 16a.

The third manipulating member 35 has a finger touch portion 35g that is formed in a front end portion thereof. The finger touch portion 35g is arranged and constructed to receive the little finger of the hand that is grasping the first grasping portion G1. Therefore, the user can manipulate or press the third manipulating member 35 by the little finger of his/her hand that is grasping the first grasping portion G1. Thus, the user can operate the electrical reciprocating saw 1' while grasping the first grasping portion G1 with one hand. Further, the finger touch portion 35g of the third manipulating member 35 corresponds to the small lever portion 23 of the first manipulating member 20 of the first embodiment.

The third manipulating member 35 further has finger touch portions 35a to 35d that are formed therein. The finger touch portions 35a to 35d are positioned behind the finger touch portion 35g and are arranged and constructed to respectively receive the index finger, the mid finger, the medicinal finger and the little finger of the hand that is grasping the second grasping portion G2. A portion of the third manipulating member 35 having the finger touch portions 35a to 35d may be referred to as a front manipulating portion corresponding to the second grasping portion G2. The front manipulating portion corresponds to the large lever portion 21 of the first manipulating member 20 of the first embodiment.

Further, the third manipulating member 35 has a finger touch portion 35e that is formed therein. The finger touch portion 35e is positioned behind the front manipulating portion and is formed to be continuous therewith. The finger touch portion 35e is arranged and constructed to receive the index finger of the hand that is grasping the third grasping portion G3. A portion of the third manipulating member 35 having the finger touch portion 35e may be referred to as a rear manipulating portion corresponding to the third grasping portion G3. The rear manipulating portion corresponds to the second manipulating member 22 of the first embodiment.

The third manipulating member 35 has an actuator portion 35f that is formed in a rear end portion thereof. The actuator portion 35f is positioned so as to contact the actuator button 16a of the electrical switch 16. Therefore, when the third manipulating member 35 is obliquely pulled rearwardly and upwardly, the actuator portion 35f can be displaced in the same direction. As a result, the actuator button 16a can be pushed in, so that the electrical switch 16 can be turned on. Similar to the first embodiment, because the electrical switch 16 is the variable switch, the number of rotations of the electric motor 14 can be continuously changed by changing a manipulation distance of the third manipulating member 35, so that the reciprocating speed of the output rod 13 can be continuously changed. Thus, the electrical reciprocating saw 1 may have increased operability.

The actuator button 16a of the electrical switch 16 is biased in the turn-off direction by the spring. Therefore, the third manipulating member 35 can be automatically returned to an off direction thereof when the third manipulating member 35 is released.

According to this embodiment, the third manipulating member 35 thus constructed can be manipulated or pulled by the hand (the left hand LH or the right hand RH) that is grasping the first grasping portion G1. Therefore, the user can operate the electrical reciprocating saw 1 while grasping the first grasping portion G1 (the forwardmost portion of the tool main body 10) with one hand. Thus, the electrical reciprocating saw 1 may have increased operability and wide variations in use.

Naturally, the user can operate the electrical reciprocating saw 1 while grasping the first grasping portion G1 and the third grasping portion G3 with both hands. Similarly, the user can operate the electrical reciprocating saw 1 while grasping the second grasping portion G2 and the third grasping portion G3 with both hands. Further, the user can operate the electrical reciprocating saw 1 while grasping the second grasping portion G2 or the third grasping portion G3 with one hand. In each case, the electrical reciprocating saw 1 may have good operability.

Third Embodiment

A third embodiment of the present invention will be described with reference to FIGS. 5 to 8.

In this embodiment, an electrical reciprocating saw 110 is exemplified as the handheld electrical power tool. The electrical reciprocating saw 110 includes a tool main body 120 and an electric motor (not shown) as a drive source. The electric motor is received in the tool main body 120. The tool main body 120 has an output rod 132 that is projected forwardly from a front end portion thereof (a right end portion in FIG. 5). As will be recognized, the output rod 132 is constructed such that a blade member or saw blade B can be attached thereto. As will be recognized, when the electric motor is actuated, the output rod 132 can be reciprocated. As a result, the saw blade B can be reciprocated, so as to cut a work-piece (not shown) such as a woody material.

Figure 5:
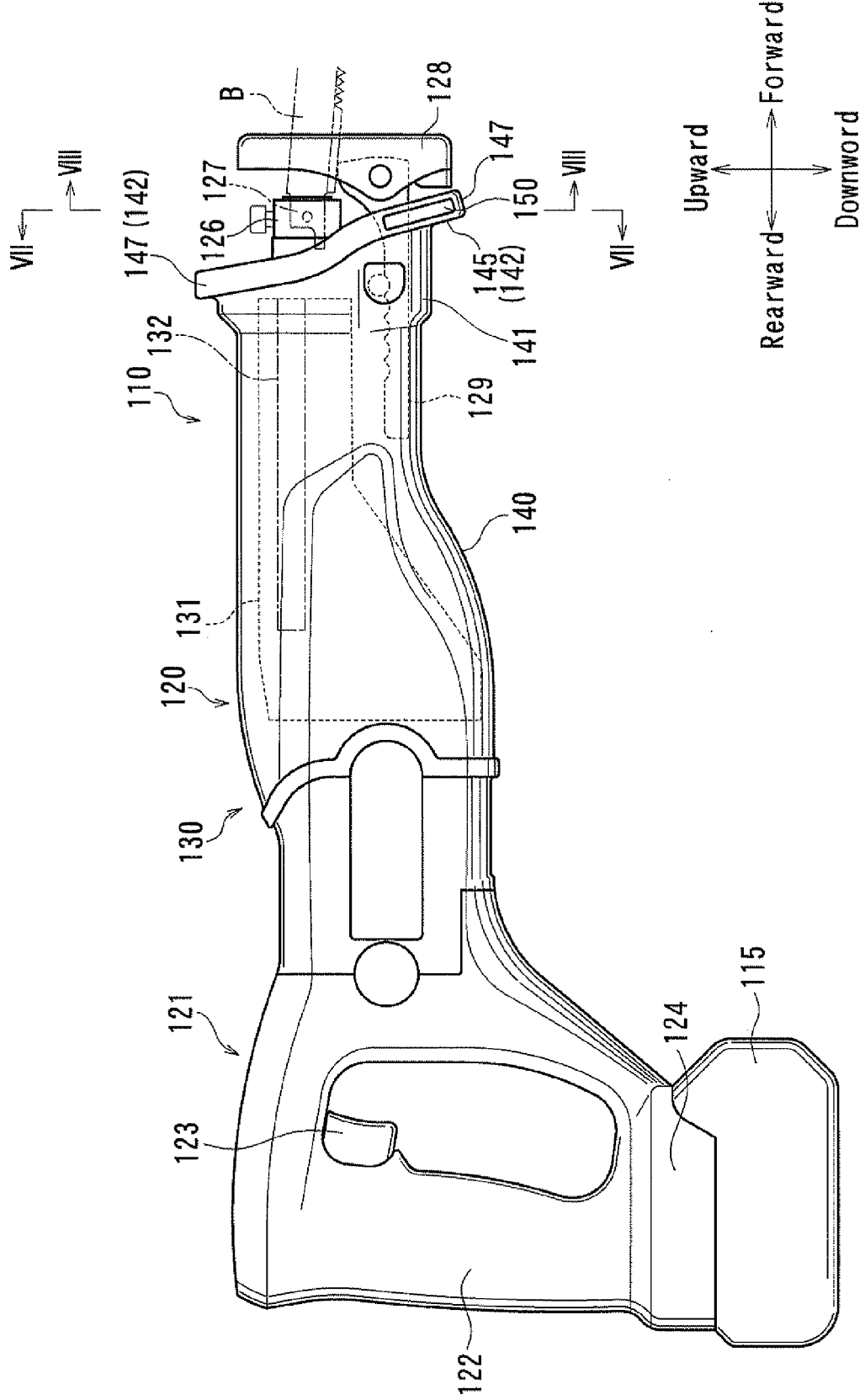
FIG. 5 is a simplified side view of a tool main body of an electrical reciprocating saw according to a third representative embodiment of the present invention.

The tool main body 120 has a handle portion 121 that is formed in a rear end portion thereof (a left end portion in FIG. 5). Conversely, the tool main body 120 has a drive unit 130 that is capable of reciprocating the output rod 132 (the saw blade B) in a longitudinal direction (in a back and forth direction). The handle portion 121 has a grip 122, a manipulating member 123 (a switching member) that is formed in the grip 122, and a battery portion 124 that is formed in a lower end thereof. The grip 122 is shaped such that a user can easily grasp the same with his/her hand. The manipulating member 123 is formed as a trigger-type switch lever. The manipulating member 123 may preferably be shaped such that the user can manipulate the same by the index finger of his/her hand that is grasping the grip 122. The battery portion 124 is shaped to be connected to a battery pack 115 that contains a rechargeable battery such as a lithium ion battery.

The drive unit 130 has a reciprocating motion conversion mechanism 131. The reciprocating motion conversion mechanism 131 is linked to an output shaft of the electric motor and the output rod 132. The output rod 132 is slidably supported by a bearing (not shown), so as to be reciprocated in the longitudinal direction (in the back and forth direction). Therefore, when the electric motor is actuated, the output rod 132 can be reciprocated. Because the drive unit 130 has a known structure, a detailed description thereof may be omitted.

Figure 7:
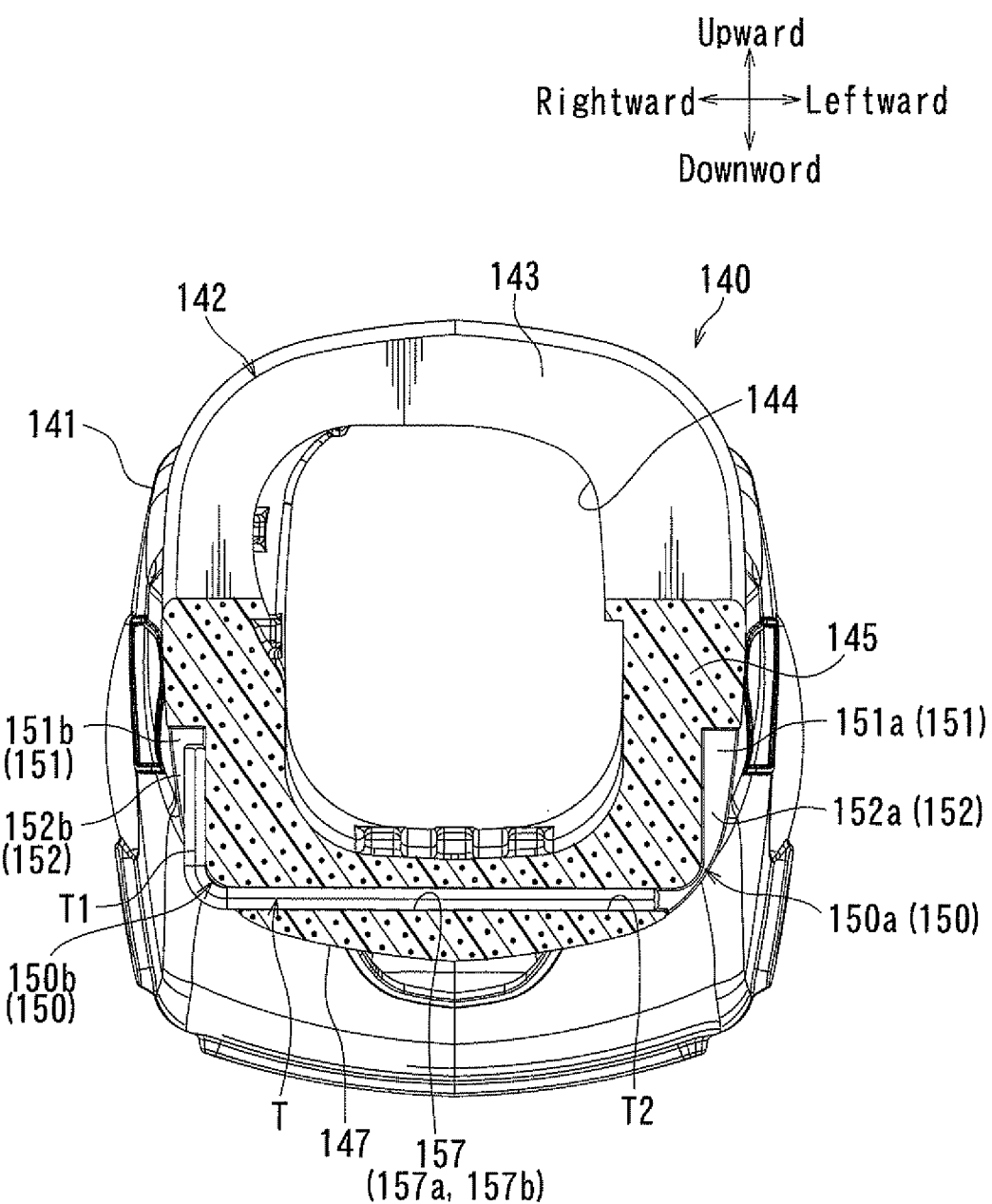
FIG. 7 is a cross-sectional view taken along line VII-VII of FIG. 5.
Figure 8:
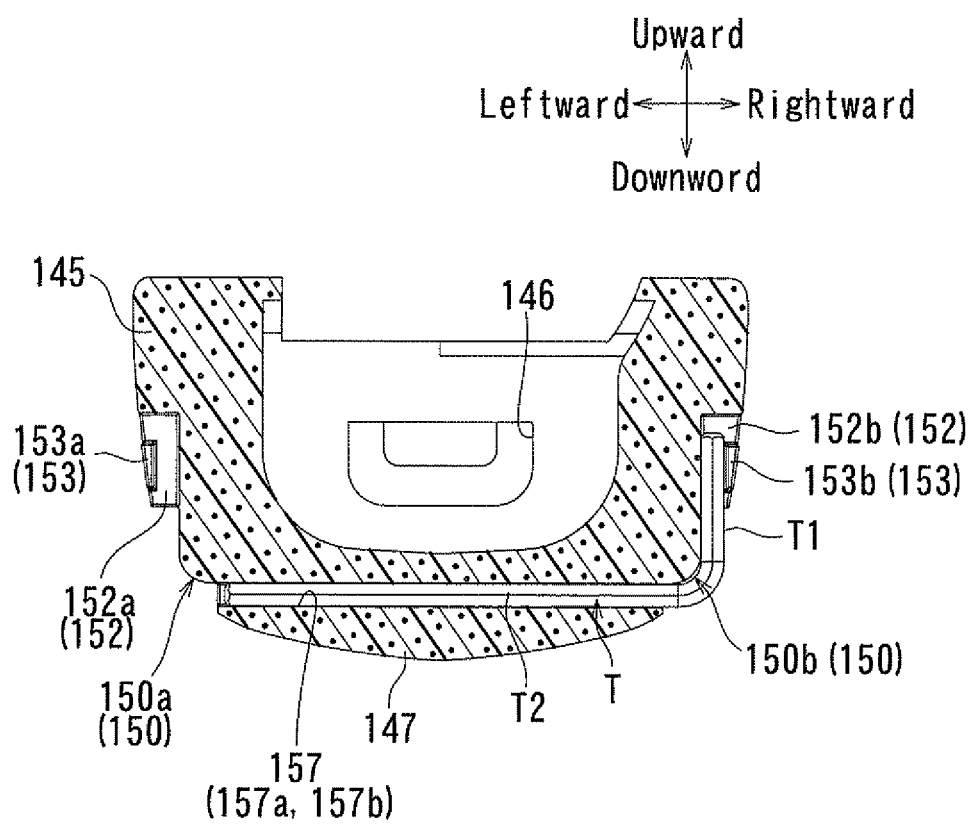
FIG. 8 is a cross-sectional view taken along line VIII-VIII of FIG. 5.

The tool main body 120 has a blade attachment device 126 that is attached to a front end portion of the output rod 132 (a right end portion in FIG. 5). The blade attachment device 126 is constructed to clamp a rear end portion of the saw blade B. Also, the blade attachment device 126 has a fixing screw 127 that is capable of fastening the clamped saw blade B. As will be hereinafter described, in order to rotate the fixing screw 127 to fasten the saw blade B, a small special-purpose tool T (which may be hereinafter referred to as a utility tool) may be used. In this embodiment, as shown in FIGS. 7 and 8, a L-shaped hexagonal wrench is exemplified as the special-purpose tool T. The special-purpose tool T (the L-shaped hexagonal wrench) has a short shank portion T1 and a long shank portion T2.

As shown in FIG. 5, the tool main body 120 has a cutting assist member or shoe member 128 that is positioned adjacent to the front end portion of the output rod 132. The shoe member 128 is slidably attached to the tool main body 120 via a stay 129, so that a relative position of the shoe member 128 to the tool main body 120 can be changed. As will be recognized, the user can determine an effective cutting range of the saw blade B by determining the relative position of the shoe member 128 to the tool main body 120.

The tool main body 120 has a covering member 140 (an outer cover) that is attached thereto. The covering member 140 is positioned to cover a substantial portion of the tool main body 120 in which the reciprocating motion conversion mechanism 131 is received. The covering member 140 may preferably be shaped such that the user can hold or grasp the same with his/her hand. The covering member 140 may function as a protector of the reciprocating motion conversion mechanism 131.

The covering member 140 may preferably be made an electrical and heat insulating material, so as to insulate electricity and heat from the electric motor and the reciprocating motion conversion mechanism 131. An example of the insulating material is an elastic material (rubber), e.g., synthetic rubber, that is capable of easily forming an undercut article.

As shown in FIG. 5, the covering member 140 has a grip portion 141 and a guard portion 142 that are integrally formed. The grip portion 141 covers the substantial portion of the tool main body 120 in which the reciprocating motion conversion mechanism 131 is received. The grip portion 141 may preferably be shaped such that the user can easily and comfortably hold or grasp the same with his/her hand.

Figure 6:
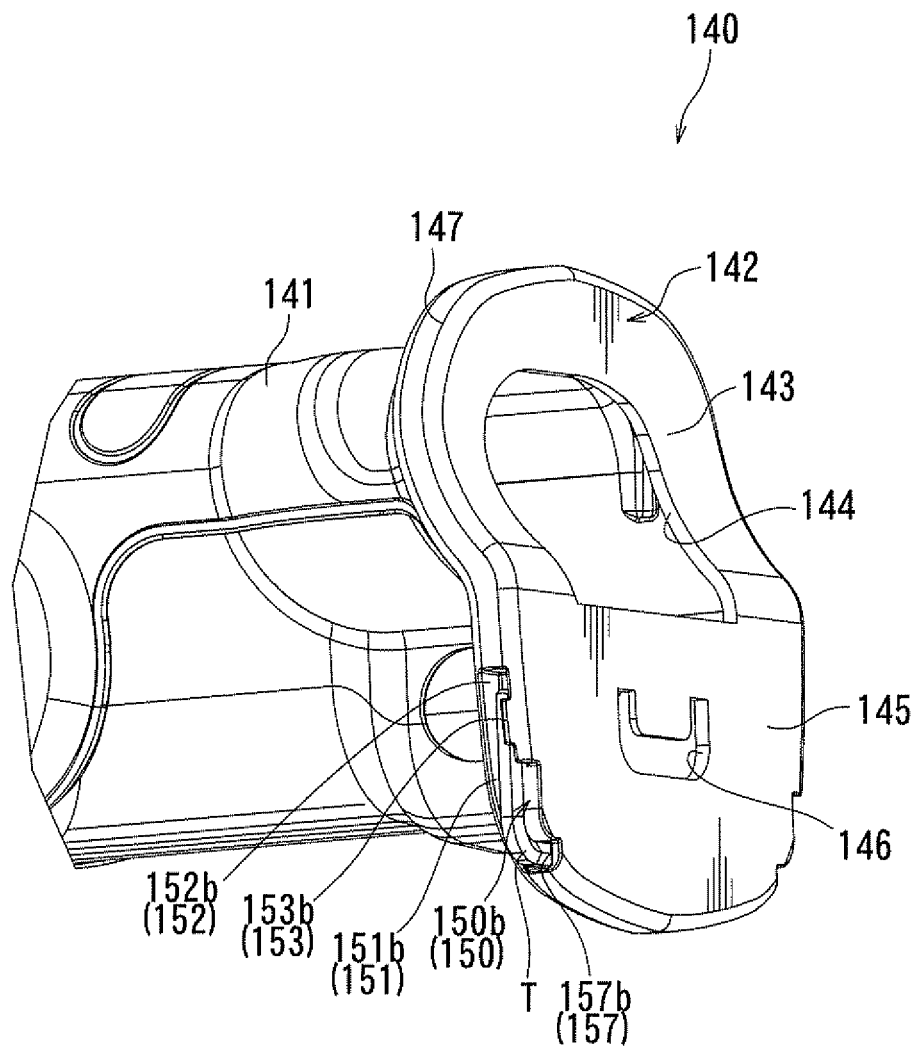
FIG. 6 is a front perspective view of a covering device.
Figure 6:
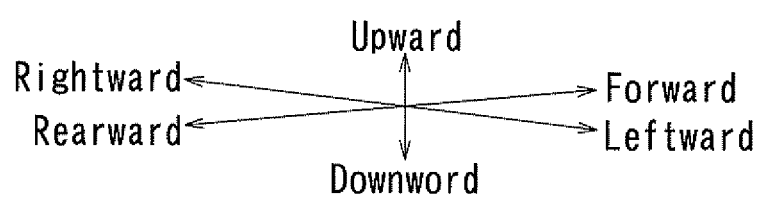

As shown in FIGS. 5 and 6, the guard portion 142 is formed in a front end periphery of the grip portion 141. The guard portion 142 is outwardly projected so as to form an annular flange 147. In particular, the annular flange 147 of the guard portion 142 is projected in a direction intersecting with a reciprocating direction (a back and forth direction) of the saw blade B. Further, in this embodiment, the annular flange 147 has a projection distance (height) of 6 mm.

As shown in FIG. 6, the guard portion 142 includes an upper guard portion 143 corresponding to an upper half thereof and a lower guard portion 145 corresponding to a lower half thereof. Further, as shown in FIG. 6, the guard portion 142 is gradually inclined forwardly from the upper guard portion 143 toward the lower guard portion 145. In other words, the grip portion 141 is shaped such that a lower portion thereof can be extended forwardly than an upper portion thereof. Therefore, after the user grasps the handle portion 121 (the grip 122) with one hand, the user can easily grasp or hold the grip portion 141 with the other hand. In particular, when the user uses the electrical reciprocating saw 110 in order to perform a cutting operation, the user generally grasps the handle portion 121 (the grip 122) with his/her right hand while holding the grip portion 141 with his/her left hand. That is, the thumb of the left hand is positioned on the upper portion of the grip portion 141 while the remaining fingers of the left hand are positioned on the lower portion of the grip portion 141. At this time, the thumb of the left hand can contact the annular flange 147 while it is positioned behind the remaining fingers of the left hand. Thus, the user can easily grasp or hold the grip portion 141 with the other hand (the left hand).

As shown in FIG. 6, the upper guard portion 143 has an opening 144, so that the output rod 132 can be projected forwardly therethrough. The opening 144 is formed in a substantial portion of the upper guard portion 143 except for the annular flange 147. Conversely, unlike the upper guard portion 143, the lower guard portion 145 has a limited opening. In particular, the lower guard portion 145 has a U-shaped opening 146 passing through the same in the longitudinal direction, so that the stay 129 of the shoe member 128 can be inserted into the tool main body 120 therethrough. The opening 146 is formed in a central portion of the lower guard portion 145. Further, as shown in FIG. 6, an annular peripheral portion of the upper guard portion 143 and the lower guard portion 145, i.e., the annular flange 147, has a continuous rounded shape.

As shown in FIGS. 6 to 8, the lower guard portion 145 of the guard portion 142 has a utility tool receiving (portion) slot 150 (a utility tool retainer portion) that is formed therein. The utility tool receiving slot 150 is arranged and constructed to receive and hold the special-purpose tool T (the utility tool) that is used to rotate the fixing screw 127 to fasten the saw blade 13. The utility tool receiving slot 150 is shaped to hold the special-purpose tool T using elasticity of the elastic material (the synthetic rubber).

As shown in FIGS. 7 and 8, the utility tool receiving slot 150 is opened in both side surfaces (right and left surfaces) of the lower guard portion 145 such that the special-purpose tool T can be inserted into the utility tool receiving slot 150 from both sides thereof. That is, the utility tool receiving slot 150 has a left-side utility tool receiving slot 150a that is opened in the left surface of the lower guard portion 145 and a right-side utility tool receiving slot 150b that is opened in the right surface of the lower guard portion 145. The left-side utility tool receiving slot 150a and the right-side utility tool receiving slot 150b are formed to be symmetrical with each other. Further, the utility tool receiving slot 150 is shaped such that the special-purpose tool T can be traveled in the direction intersecting with the reciprocating direction (the back and forth direction) of the saw blade B when the special-purpose tool T is inserted into the utility tool receiving slot 150.

As shown in FIG. 7, the utility tool receiving slot 150 has right and left insertion openings 151 that are respectively vertically formed in right and left surfaces of the annular flange 147 corresponding to the lower guard portion 145. Each of the insertion openings 151 is shaped to receive the short shank portion T1 of the special-purpose tool T. In particular, the insertion openings 151 are formed as receiving grooves 152 that are respectively extended vertically upwardly from lower ends of the right and left surface of the annular flange 147. Further, each of the receiving grooves 152 (the insertion openings 151) has a width and a length slightly greater than an outer diameter and a length of the short shank portion T1 of the special-purpose tool T, so as to reliably receive the short shank portion T1 therein. Further, the utility tool receiving slot 150 has a shank portion insertion bore 157 that is transversely formed in the lower guard portion 145. The shank portion insertion bore 157 is communicated with lower ends of the insertion openings 151. Further, the shank portion insertion bore 157 has an inner diameter and a length substantially corresponding to an outer diameter and a length of the long shank portion T2 of the special-purpose tool T, so as to receive the long shank portion T2 therein. The utility tool receiving slot 150 thus constructed has a U-shape in cross section.

As described above, the utility tool receiving slot 150 has the left-side utility tool receiving slot 150a and the right-side utility tool receiving slot 150b. Therefore, the left-side utility tool receiving slot 150a has a left insertion opening 151a that is vertically formed in the left surface of the annular flange 147. The left insertion opening 151a is shaped to receive the short shank portion T1 of the special-purpose tool T. In particular, the insertion opening 151a is formed as a receiving groove 152a that is extended vertically upwardly from a lower end of the left surface of the annular flange 147. Further, the receiving groove 152a (the left insertion opening 151a) has a width and a length slightly greater than the outer diameter and the length of the short shank portion T1 of the special-purpose tool T. Further, the left-side utility tool receiving slot 150a has a shank portion insertion bore 157a that is transversely formed in the lower guard portion 145. The shank portion insertion bore 157a is communicated with a lower end of the left insertion opening 151a. Further, the shank portion insertion bore 157a has a diameter and a length substantially corresponding to the outer diameter and the length of the long shank portion T2 of the special-purpose tool T, so as to receive the long shank portion T2 therein.

Conversely, the right-side utility tool receiving slot 150b has a right insertion opening 151b that is vertically formed in the right surface of the annular flange 147. The right insertion opening 151b is shaped to receive the short shank portion T1 of the special-purpose tool T. In particular, the right insertion opening 151b is formed as a receiving groove 152b that is extended vertically upwardly from a lower end of the right surface of the annular flange 147. Further, the receiving groove 152b (the right insertion opening 151b) has a width and a length slightly greater than the outer diameter and the length of the short shank portion T1 of the special-purpose tool T. Further, the right-side utility tool receiving slot 150h has a shank portion insertion bore 157b that is transversely formed in the lower guard portion 145. The shank portion insertion bore 157b is communicated with a lower end of the right insertion opening 151b. Further, the shank portion insertion bore 157b has a diameter and a length substantially corresponding to the outer diameter and the length of the long shank portion T2 of the special-purpose tool T, so as to receive the long shank portion T2 therein. Further, as will be recognized, the shank portion insertion bore 157b of the right-side utility tool receiving slot 150b is shared with the shank portion insertion bore 157a of the left-side utility tool receiving slot 150a.

As shown in FIGS. 6 and 8, the lower guard portion 145 of the guard portion 142 has right and left engagement projections 153 that are respectively projected into the receiving grooves 152. That is, the lower guard portion 145 has a right engagement projection 153a that is projected into the receiving groove 152a. Similarly, the lower guard portion 145 has a left engagement projection 153b that is projected into the receiving groove 152b. As will be recognized, the right and left engagement projections 153 (153a and 153b) are respectively arranged and constructed to prevent the special-purpose tool T from being dropped off from the receiving grooves 152 (152a and 152b). That is, the right and left engagement projections 153 (153a and 153b) are respectively shaped to elastically engage the short shank portion T1 of the special-purpose tool T when the special-purpose tool T is introduced into the utility tool receiving slot 150 (150a and 150b). Also, the right and left engagement projections 153 (153a and 153b) can be easily deformed, so that the special-purpose tool T can be easily removed from the utility tool receiving slot 150 (150a and 150b) by simply pulling the same.

The inner diameter of the shank portion insertion bore 157 (157a and 157b) may preferably be slightly smaller than the outer diameter of the long shank portion T2 such that the shank portion insertion bore 157 (157a and 157b) can elastically hold the long shank portion T2 when the special-purpose tool T is received in the utility tool receiving slot 150 (150a and 150b). Further, the length of the shank portion insertion bore 157 (157a and 157b) may preferably be slightly longer than the length of the long shank portion T2 of the special-purpose tool T, so as to reliably receive the long shank portion T2 therein.

According to the electrical reciprocating saw 110, the user can manipulate the manipulating member 123 by the index finger of his/her hand that is grasping the grip 122. Therefore, the electrical reciprocating saw 110 may have good operability.

The special-purpose tool T can be attached to the electrical reciprocating saw 110 while it is received in the utility tool receiving slot 150 that is formed as the utility tool retainer portion. Further, the utility tool receiving slot 150 is formed in the covering member 140 of the tool main body 120. That is, the utility tool receiving slot 150 is formed in an existing element of the tool main body 120 without additionally providing a special member. Therefore, it is possible to provide the utility tool receiving slot 150 to the tool main body 120 without increasing the number of construction elements of the tool main body 120.

Because the utility tool receiving slot 150 is formed in the covering member 140 that is made of the elastic material, the special-purpose tool T can be held using the elasticity of the elastic material. Therefore, it is possible to hold the special-purpose tool T in the utility tool receiving slot 150 without providing an additional holding device.

Further, the utility tool receiving slot 150 is formed in the guard portion 142 of the covering member 140 by removing a portion thereof. Therefore, it is possible to form the utility tool receiving slot 150 in the guard portion 142 without changing a shape and a size of the guard portion 142 (the covering member 140).

The utility tool receiving slot 150 has the left-side utility tool receiving slot 150a and the right-side utility tool receiving slot 150b. Therefore, the special-purpose tool T can be inserted into the utility tool receiving slot 150 from both sides thereof. Thus, the user can conveniently insert the special-purpose tool T into the utility tool receiving slot 150 regardless of which hand of the user is a dominant hand.

Further, the utility tool receiving slot 150 is shaped such that the special-purpose tool T can be inserted thereinto in the direction intersecting with the reciprocating direction (the back and forth direction) of the saw blade B. Therefore, cutting dust of the electrical reciprocating saw 110 can be effectively avoided from entering the utility tool receiving slot 150.

In addition, each of the shank portion insertion bore 157a of the left-side utility tool receiving slot 150a and the shank portion insertion bore 157b of the right-side utility tool receiving slot 150b is formed as a common bore. Therefore, the utility tool receiving slot 150 (the left-side and right-side utility tool receiving slots 150a and 150b) can be compactly formed.

Fourth Embodiment

The fourth detailed representative embodiment will now described with reference to FIGS. 9 to 1.

Because the fourth embodiment relates to the first embodiment, only the constructions and elements that are different from the first embodiment will be explained in detail. Elements that are the same in the first and fourth embodiments will be identified by the same reference numerals and a detailed description of such elements may be omitted.

Figure 9:
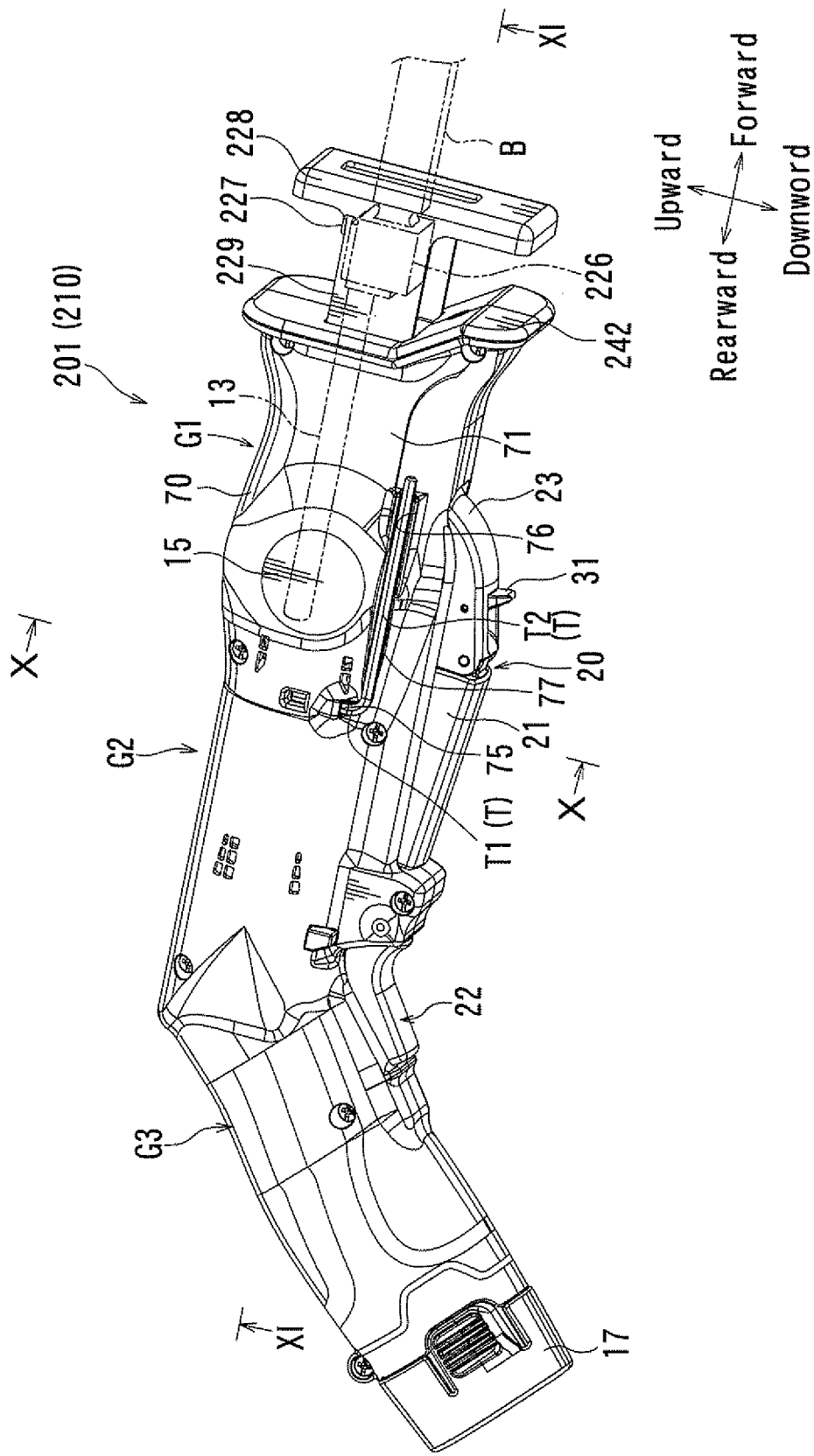
FIG. 9 is a perspective view of a tool main body of an electrical reciprocating saw according to a fourth representative embodiment of the present invention.
Figure 10:
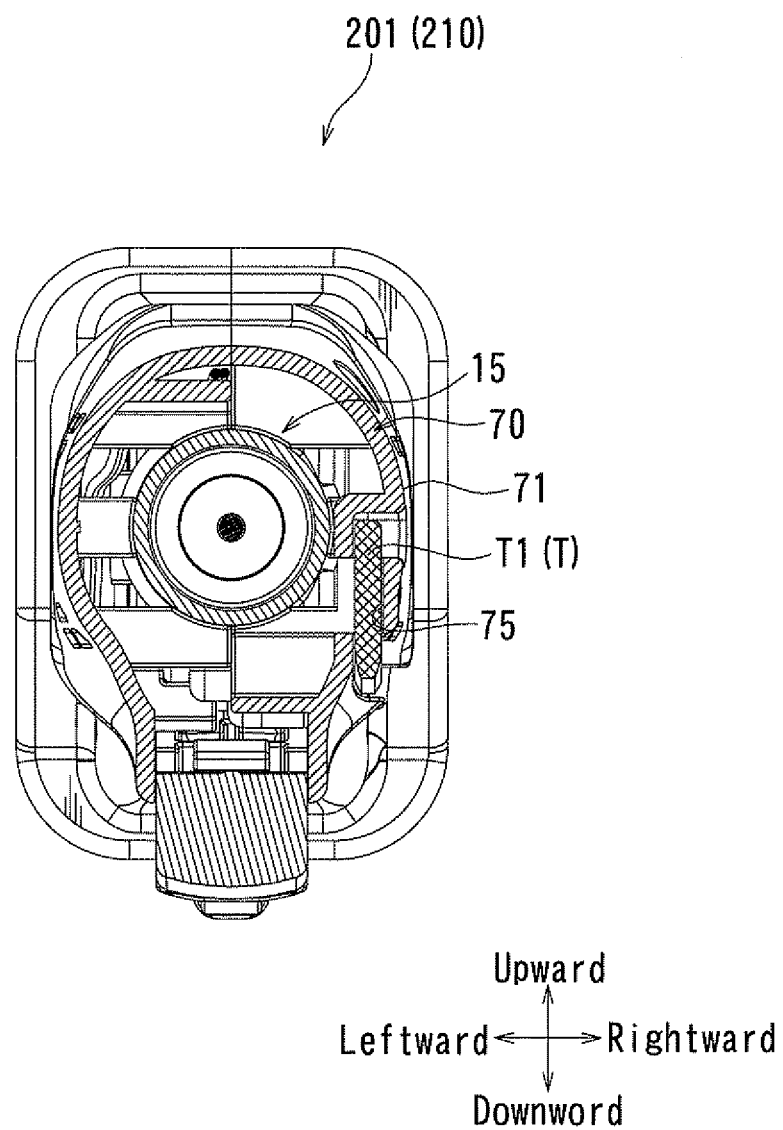
FIG. 10 is a cross-sectional view taken along line X-X of FIG. 9.
Figure 11:
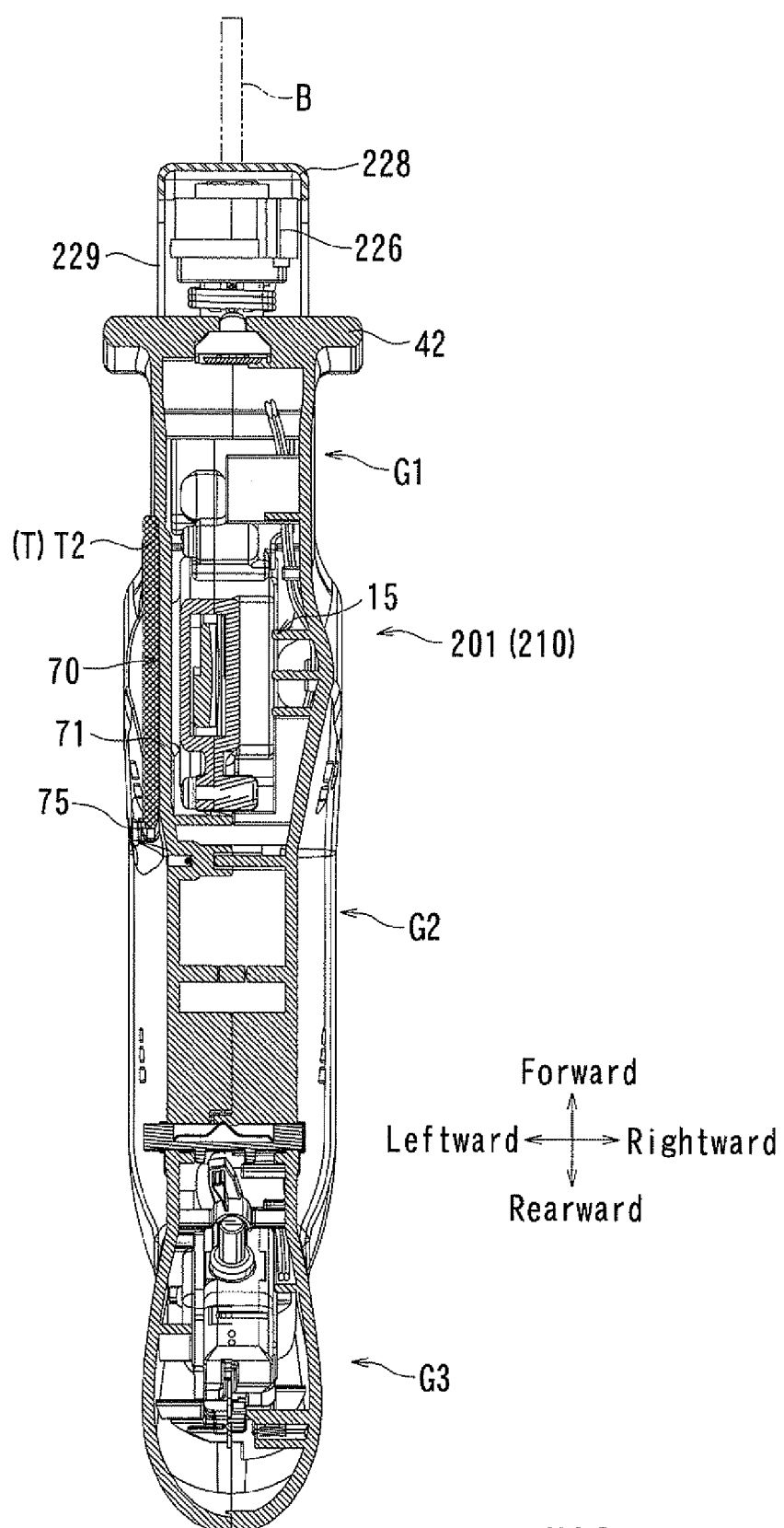
FIG. 11 is a cross-sectional view taken along line XI-XI of FIG. 9.

As shown in FIG. 9, in this embodiment, a tool main body 210 of an electrical reciprocating saw 201 has a blade attachment device 226 that is attached to the front end portion of the output rod 13. The blade attachment device 226 is constructed to clamp a rear end portion of a saw blade B. Also, the blade attachment device 226 has a fixing screw 227 that is capable of fastening the clamped saw blade B. As will be hereinafter described, in order to rotate the fixing screw 227 to fasten the saw blade B, the small special-purpose tool T (the utility tool) may be used. The special-purpose tool T (the L-shaped hexagonal wrench) has the short shank portion T1 and the long shank portion T2.

As shown in FIG. 9, the tool main body 210 has a cutting assist member or shoe member 228 that is positioned adjacent to the front end portion of the output rod 13. The shoe member 228 is slidably attached to the tool main body 210 via a stay 229, so that a relative position of the shoe member 228 to the tool main body 210 can be changed.

The tool main body 210 has a covering member 70 (an outer cover) that is attached thereto. The covering member 70 is positioned to cover the first grasping portion G1 and a portion of the second grasping portion G2. The covering member 70 may preferably be shaped such that the user can hold or grasp the same with his/her hand. The covering member 70 may function as a protector of the reciprocating motion conversion mechanism 15.

The covering member 70 may preferably be made an electrical and heat insulating material, so as to insulate electricity and heat from the electric motor and the reciprocating motion conversion mechanism 15. An example of the electrical and heat insulating material is an elastic material, e.g., elastic resin (elastomer).

As shown in FIG. 9, the covering member 70 has a (right) side wall portion 71 and a guard portion 242 that are integrally formed. The covering member 70 covers the substantial portion of the first grasping portion G1 and a portion of the second grasping portion G2. The covering member 70 may preferably be shaped such that the user can easily and comfortably hold or grasp the same with his/her hand.

As shown in FIG. 9, the covering member 70 has a utility tool receiving portion 77 (a utility tool retainer portion) that is formed in the side wall portion 71. The utility tool receiving portion 77 is arranged and constructed to receive and hold the special-purpose tool T (the utility tool) that is used to rotate the fixing screw 227 to fasten the saw blade B. The utility tool receiving portion 77 is shaped to hold the special-purpose tool T using elasticity of the elastic material (the elastic resin).

In particular, as shown in FIG. 9, the utility tool receiving portion 77 has a partially removed vertical slot 75 and a longitudinal recess 76 that is continuous with the vertical slot 75. The vertical slot 75 is shaped to receive the short shank portion T1 of the special-purpose tool T. That is, the vertical slot 75 has an inner diameter and a length corresponding to an outer diameter and a length of the short shank portion T1 of the special-purpose tool T. Conversely, the longitudinal recess 76 is shaped to receive the long shank portion T2 of the special-purpose tool T. That is, the longitudinal recess 76 has a width and a length corresponding to an outer diameter and a length of the long shank portion T2 of the special-purpose tool T.

Further, the width of the longitudinal recess 76 is slightly smaller than the outer diameter of the long shank portion T2 of the special-purpose tool T such that the long shank portion T2 can be reliably held in the longitudinal recess 76 by an elastic force of the elastic material (the covering member 70) when the long shank portion T2 is fitted into the longitudinal recess 76. That is, the longitudinal recess 76 is shaped to be elastically deformed when the long shank portion T2 is fitted thereinto.

In order to attach the special-purpose tool T to the tool main body 210, the short shank portion T1 can be inserted into the vertical slot 75 from below. Thereafter, the long shank portion T2 can be inserted or fitted into the longitudinal recess 76 while the short shank portion T1 is inserted into the vertical slot 75. Thus, the special-purpose tool T can be attached to the tool main body 210.

The electrical reciprocating saw 201 thus constructed may have the substantially same effects as the electrical reciprocating saw 1 of the first embodiment. That is, the user can easily touch or manipulate at least one of the first and second manipulating members 20 and 22 regardless of whether the user grips the tool main body 210 with one hand or both hands.

Further, the utility tool receiving portion 77 as the utility tool retainer portion of the special-purpose tool T is formed in the covering member 70 of the tool main body 210. That is, the utility tool receiving portion 77 is formed in an existing element of the tool main body 210 without additionally providing a special member. Therefore, it is possible to provide the utility tool receiving portion 77 to the tool main body 210 without increasing the number of construction elements of the tool main body 210.

Because the utility tool receiving portion 77 is formed in the covering member 70 that is made of the elastic material, the special-purpose tool T can be held using the elasticity of the elastic material. Therefore, it is possible to hold the special-purpose tool T in the utility tool receiving portion 77 without providing an additional holding device.

Further, the utility tool receiving portion 77 is formed in the covering member 70 (the side wall portion 71) by partially removing a portion thereof. Therefore, it is possible to form the utility tool receiving portion 77 in the covering member 70 without changing a shape and a size of the covering member 70.

Fifth Embodiment

The fifth detailed representative embodiment will now described with reference to FIGS. 12 to 14.

Because the fourth embodiment relates to the fourth embodiment, only the constructions and elements that are different from the fourth embodiment will be explained in detail. Elements that are the same in the fourth and fifth embodiments will be identified by the same reference numerals and a detailed description of such elements may be omitted.

Figure 12:
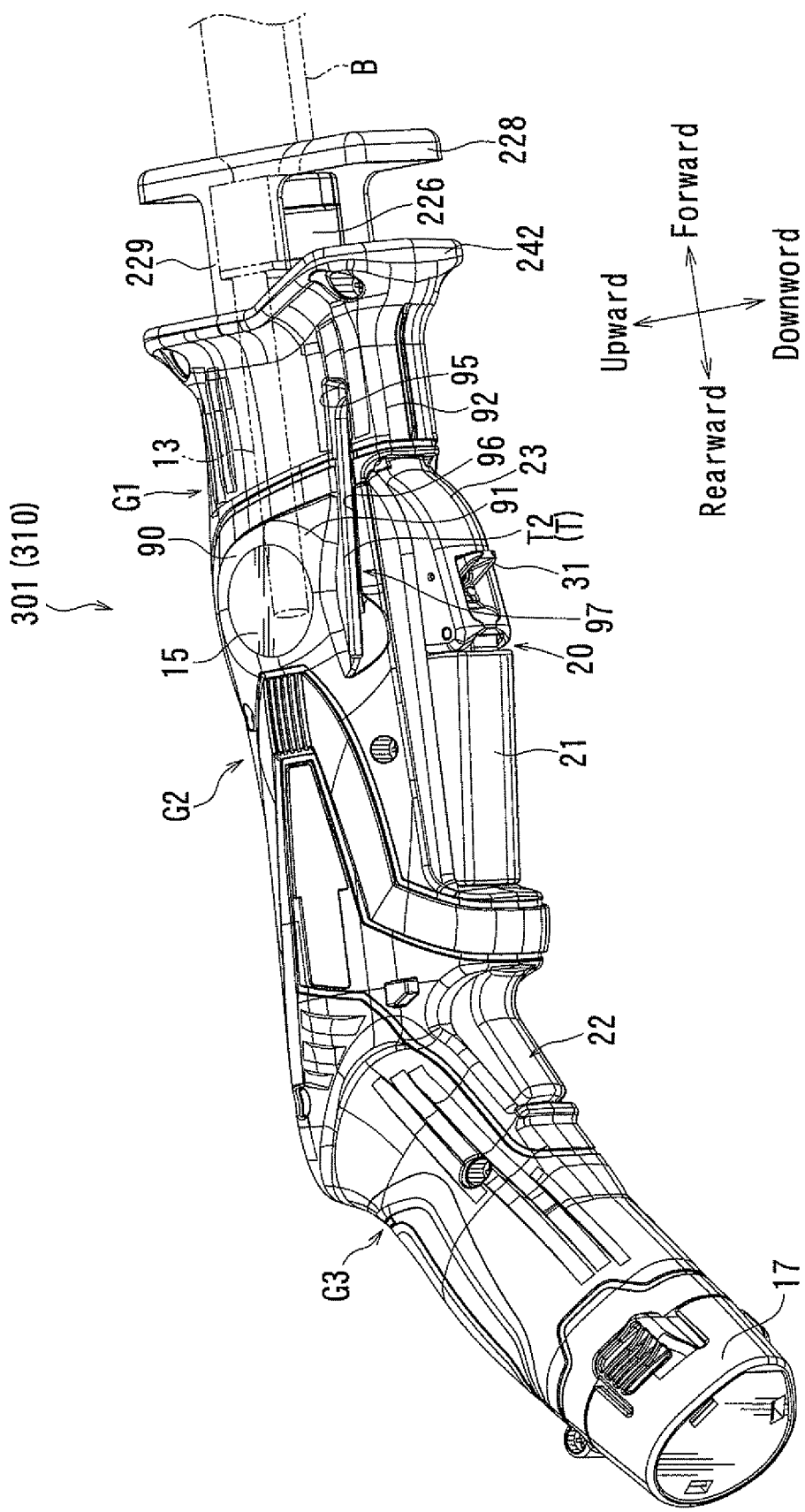
FIG. 12 is a perspective view of a tool main body of an electrical reciprocating saw according to a fifth representative embodiment of the present invention.

As shown in FIG. 12, in this embodiment, a tool main body 310 of an electrical reciprocating saw 301 has a covering member 90 (an outer cover) that is attached thereto. Similar to the covering member 70 of the fourth embodiment, the covering member 90 is positioned to cover the first grasping portion G1 and a portion of the second grasping portion G2. The covering member 90 may preferably be shaped such that the user can hold or grasp the same with his/her hand. Further, similar to the covering member 70 of the fourth embodiment, the covering member 90 may preferably be made an electrical and heat insulating material. An example of the electrical and heat insulating material is an elastic material, e.g., elastic resin (elastomer).

Figure 13:
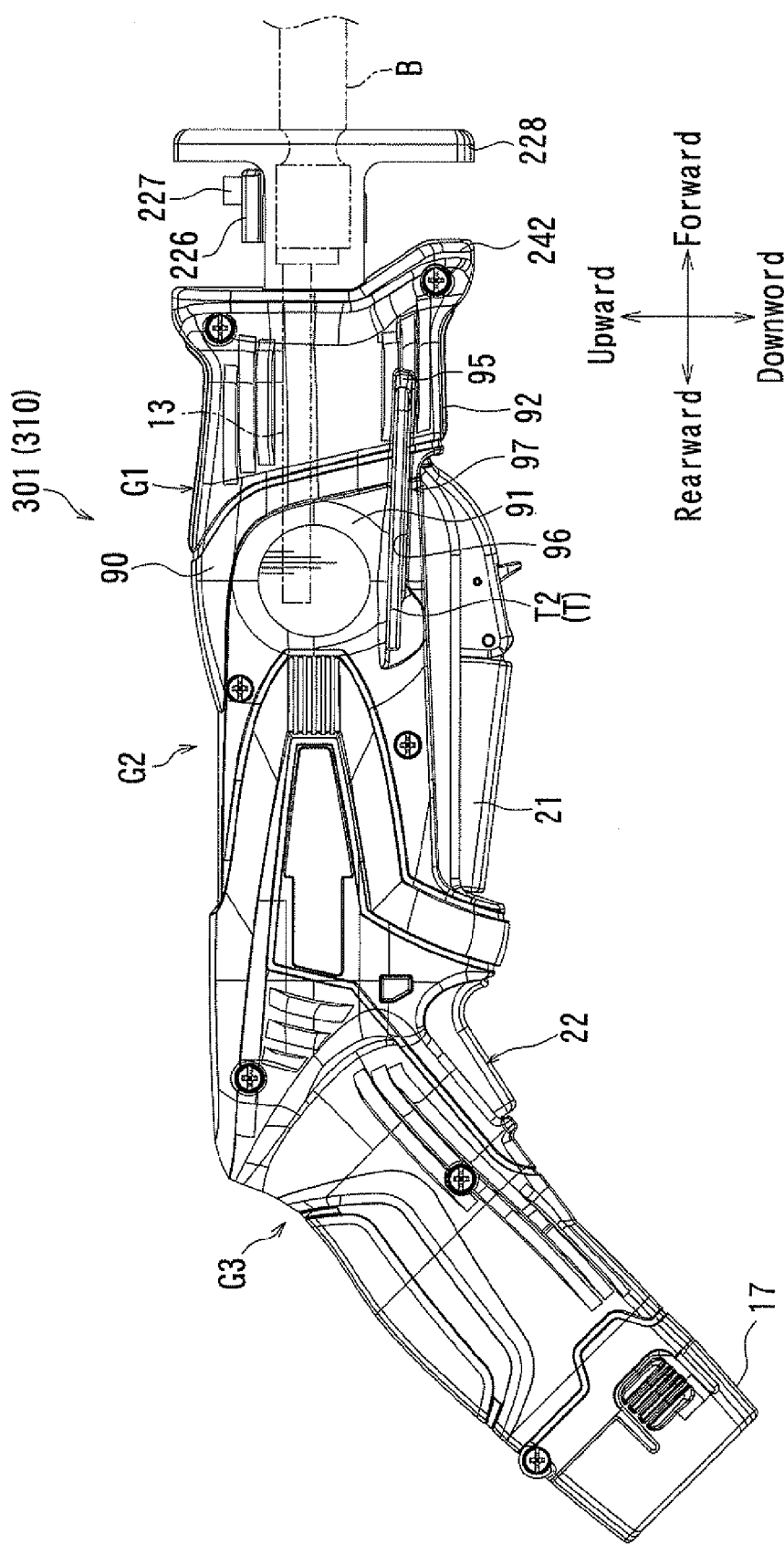
FIG. 13 is a side view of the tool main body of the electrical reciprocating saw.
Figure 14:
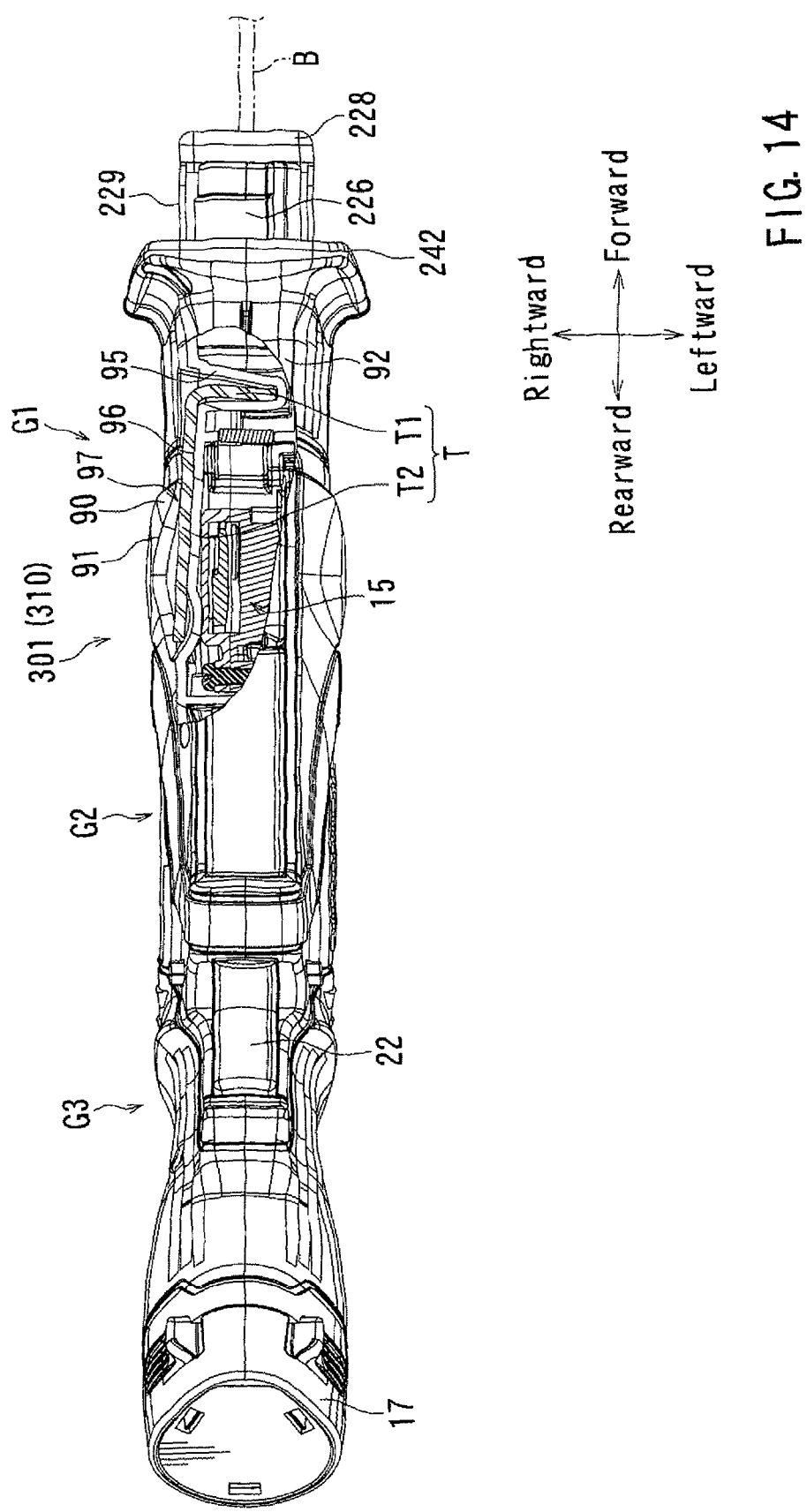
FIG. 14 is a partially cross-sectional bottom view of the tool main body of the electrical reciprocating saw.

As shown in FIGS. 12 to 14, the covering member 90 has a (right) side wall portion 91 and a bottom wall portion 92. The covering member 90 has a utility tool receiving portion 97 (a utility tool retainer portion) that is formed in the side wall portion 91. The utility tool receiving portion 97 is arranged and constructed to receive and hold the special-purpose tool T. The utility tool receiving portion 97 is shaped to hold the special-purpose tool T using elasticity of the elastic material (the elastic resin).

In particular, as best shown in FIG. 14, the utility tool receiving portion 97 has a lateral bore 95 that is formed in the bottom wall portion 92 so as to be transversely extended therealong, and a longitudinal recess 96 that is formed in the side wall portion 91 so as to be continuous with the lateral bore 95. The lateral bore 95 is shaped to receive the short shank portion T1 of the special-purpose tool T. That is, the lateral bore 95 has an inner diameter and a length corresponding to the outer diameter and the length of the short shank portion T1 of the special-purpose tool T. Conversely, the longitudinal recess 96 is shaped to receive the long shank portion T2 of the special-purpose tool T. That is, the longitudinal recess 96 has a width and a length corresponding to the outer diameter and the length of the long shank portion T2 of the special-purpose tool T.

Further, the width of the longitudinal recess 96 is slightly smaller than the outer diameter of the long shank portion T2 of the special-purpose tool T such that the long shank portion T2 can be reliably held in the longitudinal recess 96 by an elastic force of the elastic material (the covering member 90) when the long shank portion T2 is received in the longitudinal recess 96. That is, the longitudinal recess 96 is shaped to be elastically deformed when the long shank portion T2 is fitted thereinto.

In order to attach the special-purpose tool T to the tool main body 310, the short shank portion T1 can be simply inserted into the lateral bore 95 from right to left. Thereafter, the long shank portion T2 can be inserted or fitted into the longitudinal recess 96 while the short shank portion T1 is inserted into the lateral bore 95. Thus, the special-purpose tool T can be attached to the tool main body 310.

The electrical reciprocating saw 301 thus constructed may have the substantially same effects as the electrical reciprocating saw 201 of the fourth embodiment.

Various changes and modifications may be made to the present invention without departing from the scope of the previously shown and described embodiments. For example, in the embodiments the small electrical reciprocating saw is exemplified as the handheld electrical power tool. However, a jig saw or other such electrical reciprocating tools can be used as the handheld electrical power tool.

Further, in the embodiments, the covering member that is positioned to cover the substantial portion of the tool main body is exemplified as the outer cover. However, the outer cover is not limited to such a covering member.

In the embodiments, the utility tool receiving portion is formed as a combination of the slot, the groove and the bore. However, the utility tool receiving portion may have various shapes. Further, the number and the position of the utility tool receiving portion can be changed as necessary.

Further, the utility tool receiving portion is formed to receive the hexagonal wrench that is exemplified as the special-purpose tool T. However, the utility tool receiving portion can be modified to receive various tools other than the hexagonal wrench.

Further, the utility tool receiving portion is formed in the outer cover that is made of the synthetic rubber or the elastic resin (elastomer). However, the utility tool receiving portion can be formed in an outer cover that is made of natural rubber or other such elastic materials.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A handheld electrical power tool, comprising:
  a tool main body;
  a motor disposed in the tool main body;
  a reciprocating motion conversion mechanism disposed in the tool main body and being capable of converting rotational motion of the motor to longitudinal reciprocating motion,
  an electrical switch;
  a first lever capable of manipulating the electrical switch, and
  a second lever,
  wherein the first lever is overlapped with the reciprocating motion conversion mechanism and/or the motor in a longitudinal direction of the power tool, and
  wherein the second lever is different from the first lever, and the second lever is spaced apart from the first lever without overlapping with the first lever in the longitudinal direction of the power tool and without directly contacting with the first lever.

2. A handheld electrical power tool, comprising:
  a tool main body;
  a motor disposed in the tool main body;
  a reciprocating motion conversion mechanism disposed in the tool main body and being capable of converting rotational motion of the motor to longitudinal reciprocating motion,
  an electrical switch;
  a first lever capable of manipulating the electrical switch, and
  a second lever, wherein the first lever is overlapped with the reciprocating motion conversion mechanism and/or the motor in a longitudinal direction of the power tool, and wherein each of the first lever and the second lever is independently capable of manipulating the electrical switch.

* * * * *